(12) United States Patent
Sekido

(10) Patent No.: US 6,311,193 B1
(45) Date of Patent: Oct. 30, 2001

(54) COMPUTER SYSTEM

(75) Inventor: Kazunori Sekido, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/161,508

(22) Filed: Sep. 28, 1998

(30) Foreign Application Priority Data

Oct. 13, 1997 (JP) .................................................. 9-279157

(51) Int. Cl.[7] .................................................. G06F 17/30
(52) U.S. Cl. .......................................... 707/202; 711/154
(58) Field of Search ............................. 707/202; 711/154

(56) References Cited

U.S. PATENT DOCUMENTS

| 5,151,987 | * | 9/1992 | Abraham et al. ....................... 714/20 |
| 5,317,730 | * | 5/1994 | Moore et al. .......................... 707/100 |
| 5,379,398 | * | 1/1995 | Cohn et al. ............................ 711/154 |
| 5,664,155 | * | 9/1997 | Elko et al. ............................. 711/170 |
| 5,678,024 | * | 10/1997 | Wagar et al. .......................... 711/129 |
| 5,678,042 | * | 10/1997 | Pisello et al. ........................... 711/47 |
| 5,761,626 | * | 6/1998 | Sakakura et al. ......................... 710/1 |
| 5,852,818 | * | 12/1998 | Guay et al. .............................. 707/1 |
| 6,052,799 | * | 4/2000 | Li et al. ................................ 714/13 |
| 6,078,990 | * | 6/2000 | Frazier ................................. 711/114 |
| 6,202,136 | * | 3/2001 | Wikle et al. .......................... 711/162 |
| 6,230,200 | * | 5/2001 | Forecast et al. ...................... 709/226 |

OTHER PUBLICATIONS

Publication by David Hitz, et al., "File System Design for an NFS Server Appliance," (Proceedings of the Winter 1994 USENIX Conference, Jan. 17–21, 1994, San Francisco California, USA, pp. 235–245.).

Publication by Sailesh Chutani, et al., "The Episode File System," (Proceedings of the Winter 1992 USENIX Conference, Jan. 20–24, 1994, San Francisco, California, USA, pp. 43–60.).

* cited by examiner

Primary Examiner—Wayne Amsbury
(74) Attorney, Agent, or Firm—Finnegan, Henderson, Farabow, Garrett & Dunner, L.L.P.

(57) ABSTRACT

Snapshot management means intervenes between a file system for managing access, including update, to files stored in nonvolatile storage devices and the nonvolatile storage devices. The snapshot management means creates a snapshot holding the contents of the files at a specific point in time for each of the nonvolatile storage devices and stores the created snapshot into the corresponding nonvolatile storage device. The configuration makes it possible to create snapshots effectively without any modification to application programs or a file system.

30 Claims, 32 Drawing Sheets

|     | ST# | BLK# |
| --- | --- | --- |
| L1  | ST1 | B1 |
| L2  |     | B2 |
| L3  |     | B3 |
| L4  |     | B4 |
| L5  |     |    |
| L6  |     |    |
| L7  |     |    |
| L8  |     |    |
| L9  |     |    |
| L10 |     | B10 |
| L11 | ST1 | B11 |
| L12 | ST2 | B1 |
| L13 |     | B2 |
| L14 |     | B3 |
| L15 |     | B4 |
| L16 |     |    |
| L17 |     |    |
| L18 |     |    |
| L19 |     |    |
| L20 |     |    |
| L21 |     | B10 |
| L22 | ST2 | B11 |
| L23 | ST3 | B1 |
| L24 |     | B2 |
| L25 |     | B3 |
| L26 |     | B4 |
| L27 |     | B5 |
| L28 |     | B6 |

(a) SNAPSHOT CONVERSION MAP

|     | ST# | BLK# |
| --- | --- | --- |
| L1  | ST1 | B1 |
| L2  | ST1 | B2 |
| (L3) | ST4 | B11 |
| L4  | ST1 | B4 |
| L5  | ST1 | B5 |
| L6  | ST1 | B6 |
| (L7) | ST4 | B10 |
| L8  | ST1 | B8 |
| (L9) | ST4 | B9 |
| L10 | ST1 | B10 |
| (L11) | ST4 | B8 |
| L12 | ST2 | B1 |
| (L13) | ST4 | B7 |
| L14 | ST2 | B3 |
| (L15) | ST4 | B6 |
| L16 | ST2 | B5 |
| (L17) | ST4 | B5 |
| L18 | ST2 | B7 |
| (L19) | ST4 | B4 |
| L20 | ST2 | B9 |
| (L21) | ST4 | B3 |
| L22 | ST2 | B11 |
| L23 | ST3 | B1 |
| L24 | ST3 | B2 |
| (L25) | ST4 | B2 |
| L26 | ST3 | B4 |
| (L27) | ST4 | B1 |
| L28 | ST3 | B6 |

(b) READING CONVERSION MAP

FIG. 16

COMPUTER SYSTEM

BACKGROUND OF THE INVENTION

This invention relates to a computer system which efficiently creates snapshots holding the contents at a specific point in time of the files stored in a nonvolatile storage device.

A redundant disk structure has been used to cope with defects in a single disk. The redundancy technique, however, is useless against the loss or change of programs or data due to software bugs, erroneous operations, or infection with viruses, or against such a serious fault as the loss of a disk storage device itself. To deal with these problems, it is essential to create snapshots or backups.

A snapshot is a copy image of a file or a disk at a certain point in time. A file or the whole disk is copied at regular intervals into the same disk storage device or a different disk storage device to create a snapshot. In case a program or data has been lost or changed, the fault will be coped with by restoring the program or data or the whole disk in the snapshot created immediately before the occurrence of the fault.

A backup is a copy of the snapshot saved and stored in a different mass storage system (e.g., magnetic taps). With backups, even if the disk storage device itself has been lost (and naturally the whole data in the device has been lost), the programs or data at the time of creating the snapshots can be restored by loading the backups into a new disk storage device.

In general, to create snapshots or backups, it is necessary to stop all of the application programs that will possibly change the related files, or else they would change the files or data in the middle of creating a copy, preventing the snapshot or backup from being created correctly. Because restoring the incorrect snapshot or backup to the disk storage device introduces the danger of permitting an error or a faulty operation to occur on the application program side, the approach cannot be used to deal with the fault.

Since data is generally written into a disk storage device faster than into a mass storage system, creating snapshots and backing up them on a mass storage medium shortens the stopping time of application programs more than backing up the files or disk images directly. Use of snapshots enables the programs or data from being recovered from the loss or change in a shorter time. When backups are made using a sequential access medium, such as magnetic tape, a lot of time is needed to find a specific file, resulting in a very low efficiency.

File systems have been disclosed which have a snapshot function that solves the problem of having to stop the application programs for a long time to create snapshots or backups (reference 1: "The Episode File System," Proceedings of the Winter 1992 USENIX Conference, pp. 43–60, San Francisco, Calif.; reference 2: "File System Design for an NFS File Server Appliance," Proceedings of the Winder 1994 USENIX Conference, pp. 235–244, San Francisco, Calif.).

These file systems (e.g., in reference 2) are based on the assumption that a file has a block tree structure with root I node as the starting point as shown in FIG. 1(a). At the time of creating a snapshot, a copy of the root I node is made. The copied I node (snapshot I node) represents a block tree structure as a snapshot. The root I node to be copied represents a block tree structure of the active file system which data is read from and written into. Because the snapshot I node points at the same block as the root I node when it has just been created (FIG. 1(b)), the disk space is not used at all, except that it is used for the copied I node for a new snapshot.

Suppose the user has changed data block D. In this case, as shown in FIG. 1(c), a new data block D' is written onto a disk and the file system represented by root I node is changed to point at the new block. The original data block D on the disk remains unchanged and snapshot I node still points at the original data block D. This enables data blocks A, B, C, D, and E at the time of creating the snapshot to be referred to by specifying snapshot I node.

As described above, use of a file system with a snapshot function enables a snapshot to be created easily by simply copying the root I node without stopping the application programs. Because a snapshot can be stored in a mass storage system in parallel with the execution of the application programs, backups can be made without stopping the application programs. This eliminates the need of stopping the application programs to shelter the data in the snapshot or backup.

In the aforementioned approach, it is necessary to develop a new dedicated file system, which cannot be applied as it is to existing computer systems. Furthermore, the file system itself is based on the assumption that it has a block tree structure. Therefore, the techniques used in the file system are not applicable to an extent-based file system, such as Microsoft NTFS. A file system generally has a large tree structure. To update data block D to D', all of the intermediate nodes existing in the route between the data blocks from root I node to the data block D have to be copied as shown in FIG. 2, resulting in a great decrease in the update performance after the creation of snapshots. Moreover, the addition of a snapshot function to a file system, a complex software module, allows only the reading of snapshots and therefore makes the system much less flexible.

BRIEF SUMMARY OF THE INVENTION

The object of the present invention is to provide a computer system which is applicable as it is to an existing computer system or file system and enables very flexible data sheltering that allows the update of snapshots.

The foregoing object is accomplished by providing a computer system provided with a file system for managing access, including update, to files stored in one or more nonvolatile storage devices, comprising: snapshot management means which intervenes between the file system and the nonvolatile storage devices and which creates, for each of the nonvolatile storage devices, a snapshot holding the contents of the files at a specific point in time and stores the snapshot into the corresponding nonvolatile storage device.

The foregoing object is also accomplished by providing a data sheltering method in a computer system provided with a file system for managing access, including update, to files stored in a nonvolatile storage device and a writing buffer with a storage capacity equivalent to a K number of logical blocks, comprising: the step of accumulating logical blocks of data items to be updated in the writing buffer in a normal writing process; the step of delaying the update of the data items in the logical blocks until the number of the accumulated logical blocks has reached K–1; the step of creating a logical address tag block composed of the logical addresses for the individual logical blocks accumulated in the writing buffer; the step of adding a time stamp for maintaining the temporal order of writing to the logical address tag block; the step of adding the logical address tag block to a K–1 number of blocks to form one stripe containing a K number of logical blocks and writing stripes consecutively in an empty area different from the area holding the data to be updated on the nonvolatile storage device; the step of determining the logical addresses for a K−1−L number of logical blocks in the writing buffer unfilled with the logical blocks of data items at the time of creating a snapshot to be null addresses in a snapshot creation process of creating a snapshot holding the contents of the file at a specific point in time; the step of creating a logical address tag block composed of the logical addresses for an L number of logical blocks accumulated. in the writing buffer at the time of creating the snapshot and the null addresses; the step of adding a time stamp for maintaining the temporal order of writing to the logical address tag block; the step of adding the logical address tag block to a K−1 number of blocks including the L number of logical blocks to form one stripe containing a K number of logical blocks and writing stripes consecutively in an empty area different from the area holding the data to be updated into the nonvolatile storage device; and the step of recording the added time stamp as snapshot information.

Specifically, snapshot management means which creates, for each of the nonvolatile storage devices, a snapshot holding the contents of the files at a specific point in time and stores the snapshot into the corresponding nonvolatile storage device is provided between a nonvolatile storage device, such as a disk device, and a file system for managing access, including update, to files stored in the nonvolatile storage device.

With the present invention, snapshots can be created efficiently without any modification to an existing operating system, file system, or application programs.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 16 shows the snapshot conversion map and read conversion map in a case where the disk is in the state of FIG. 15;

DETAILED DESCRIPTION OF THE INVENTION

Hereinafter, referring to the accompanying drawings, embodiments of the present invention will be explained.

First Embodiment

Figure 1:
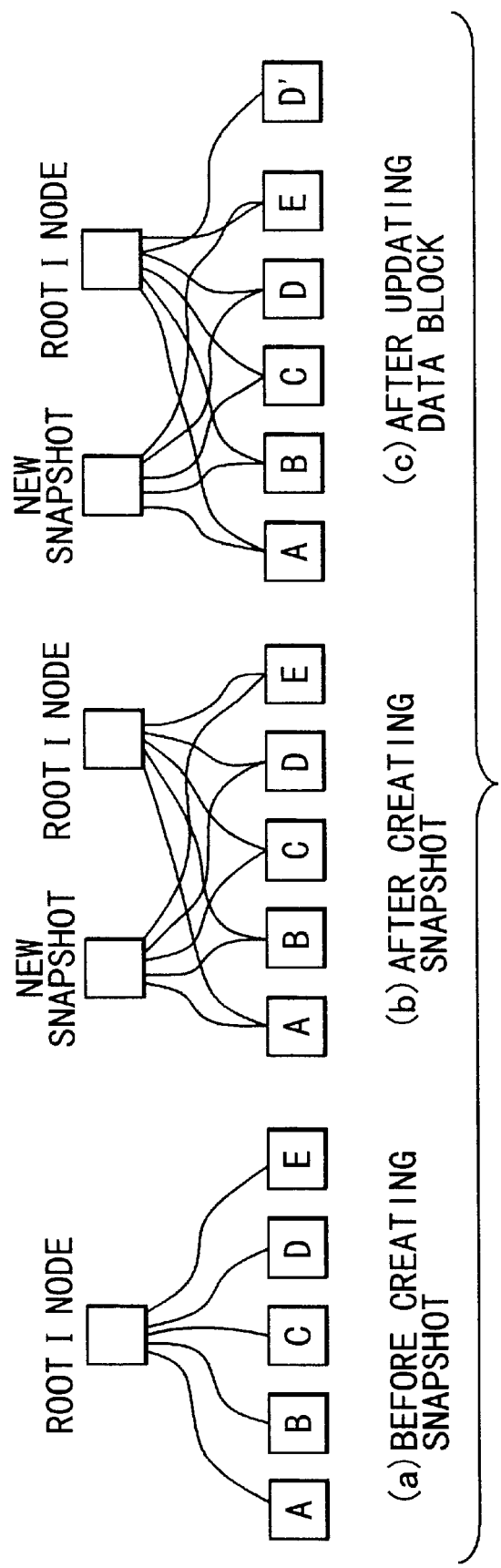
FIG. 1 is a diagram to help explain the creation of a conventional snapshot.
Figure 2:
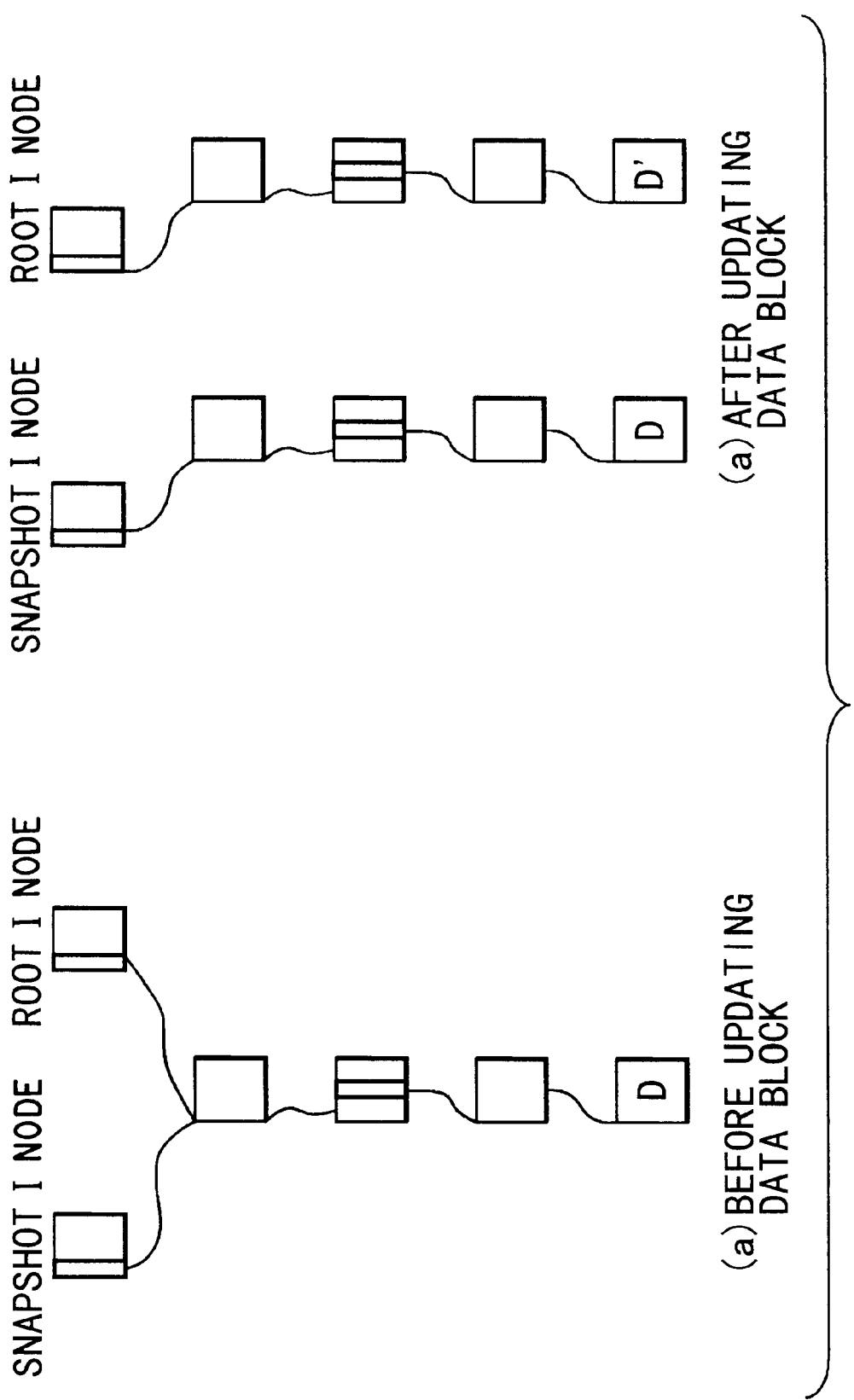
FIG. 2 is a diagram to help explain the problem encountered in creating a conventional snapshot.
Figure 3:
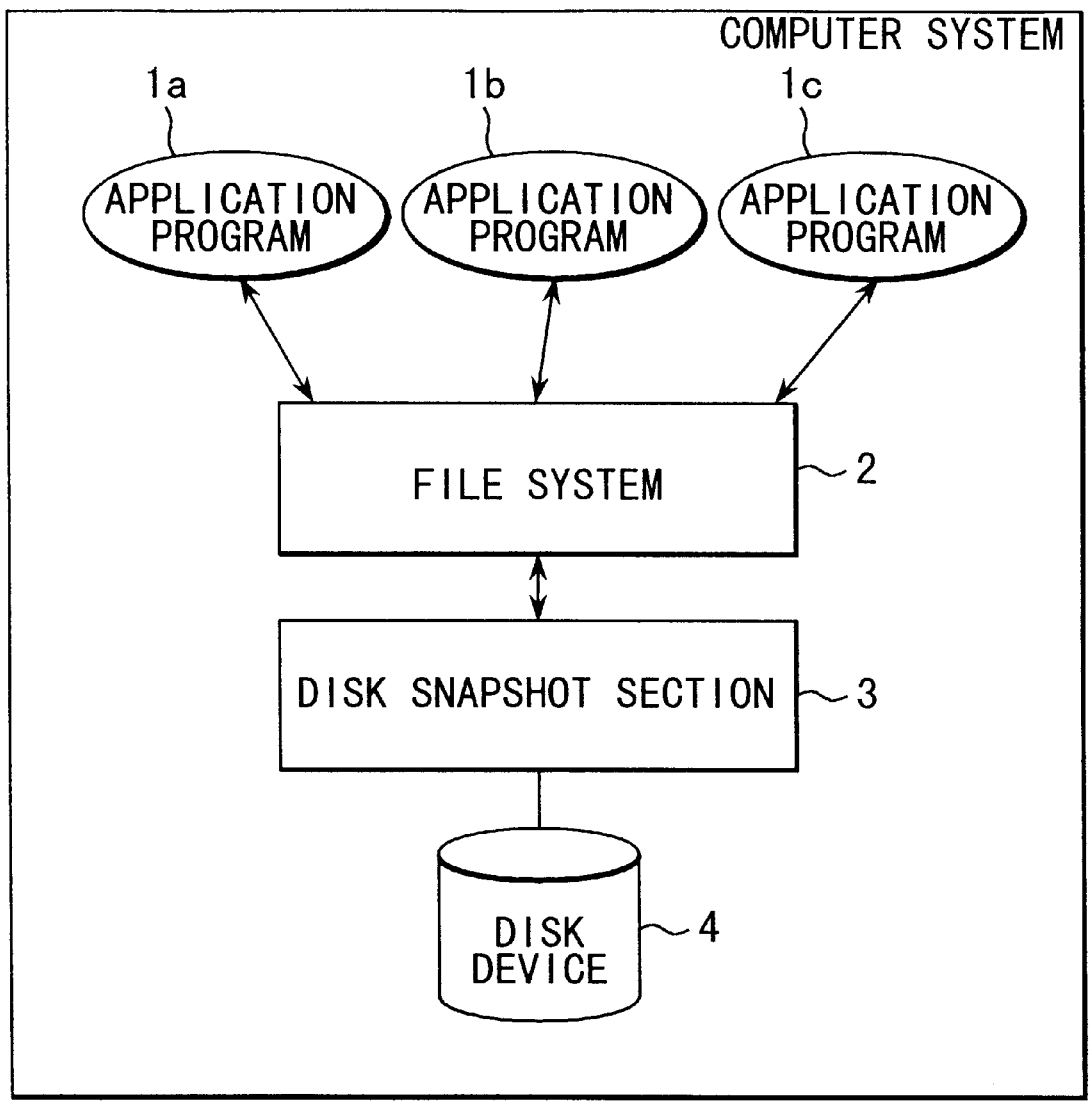
FIG. 3 is a conceptual diagram of a computer system according to a first embodiment of the present invention.

A first embodiment of the present invention will be explained. FIG. 3 is a conceptual diagram of a computer system according to the first embodiment. The computer system comprises application programs 1a to 1c needing snapshots or backups, an existing file system 2 the application programs 1a to 1c use, a disk snapshot section 3 that is located between the file system 2 and the disk device 4 and creates a disk-level snapshot, and a disk device 4 in which the data in the file system 2 or the data in the disk snapshot section 3 is stored.

The application programs 1a to 1c, file system 2, and disk device 4 are ordinary component parts as found in an existing computer system. The file system 2 need not have a block tree structure at all differently from the prior art. The file system 2 is an existing one and need not have a snapshot function differently from the prior art. The present invention is characterized by the disk snapshot section 3. Therefore, hereinafter, the disk snapshot section 3 will be explained.

Figure 4:
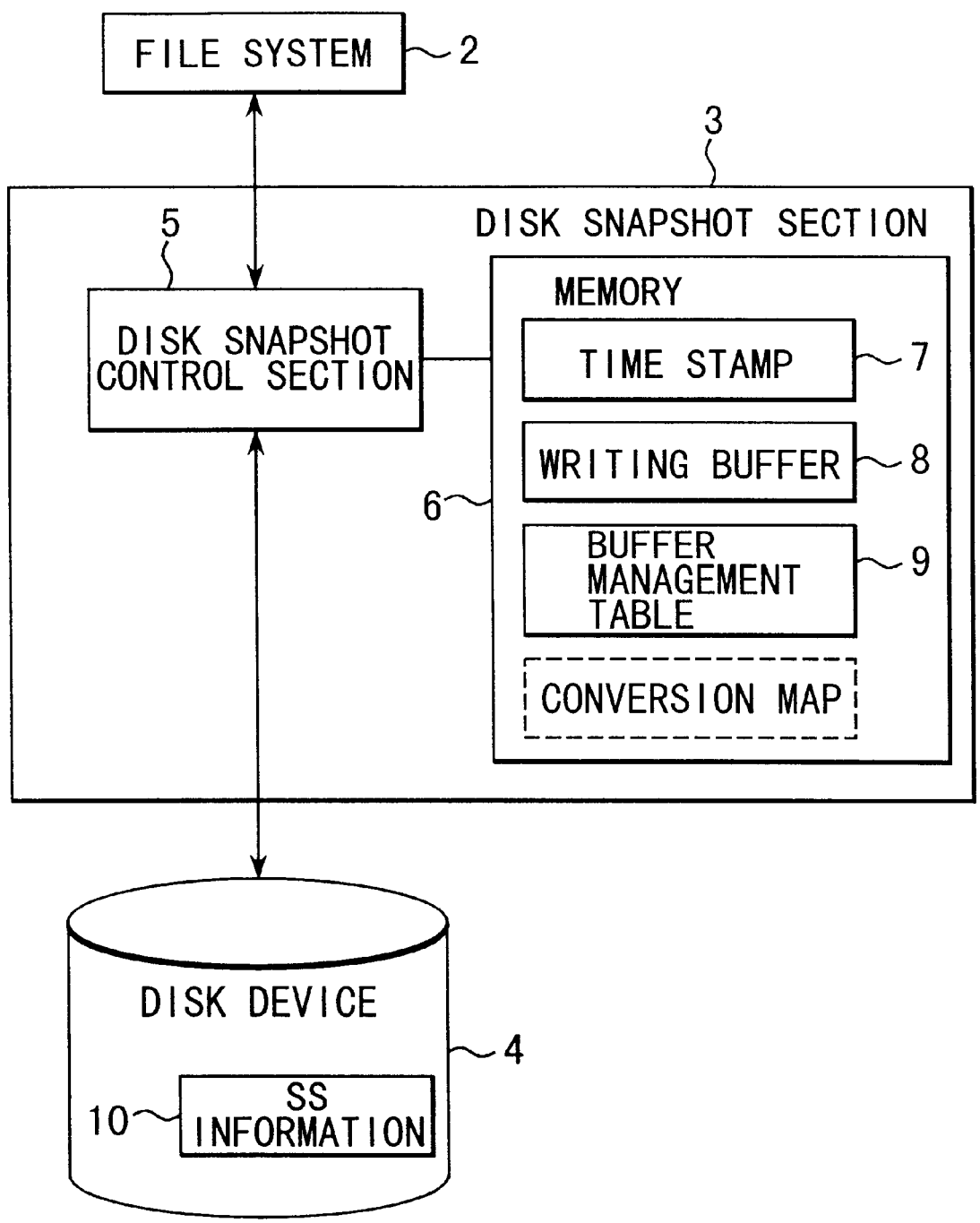
FIG. 4 is a conceptual diagram of the structure of the disk snapshot section according to the first embodiment.

FIG. 4 is a conceptual diagram of the structure of the disk snapshot section 3 in the first embodiment. As shown in FIG. 4, the disk snapshot section 3 is composed of a disk snapshot control section 5 and a volatile memory 6. The volatile memory 6 stores a time stamp 7 for maintaining the temporal order of writing, a write buffer 8 for giving a log structure to the data to be written into the disk device 4 and storing the resulting data, and a buffer management table 9 for storing an empty area in the buffer 8 and information on the logical address for the stored writing data. The disk device 4 stores snapshot information (SS information) 10 in addition to ordinary data. The disk snapshot control section 5 manages the time stamp 7, writing buffer 8, buffer management table 9, and snapshot information 10 and controls the reading/ writing of data from and into the disk device 4 and the reference to the snapshot information.

Figure 5:
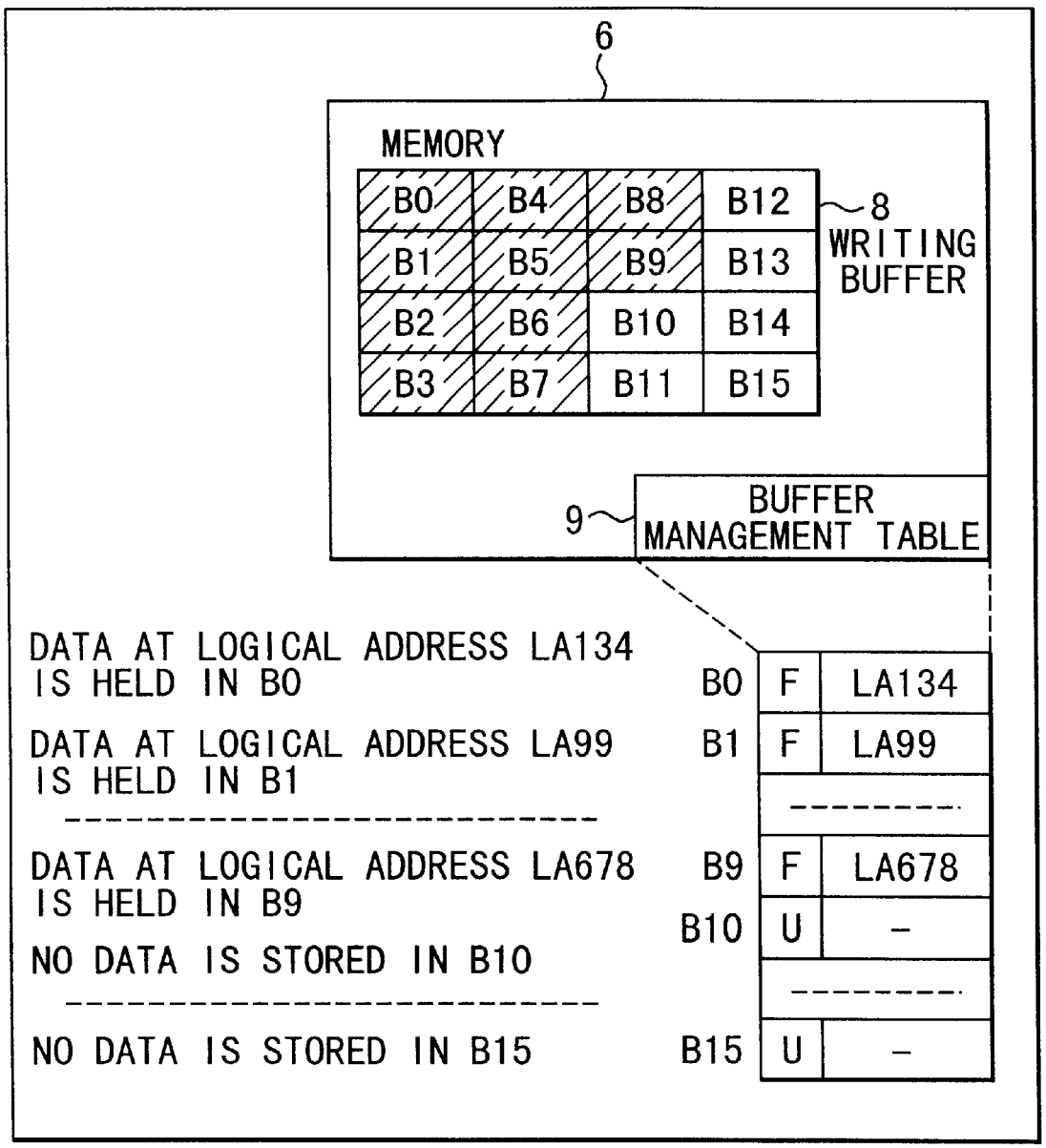
FIG. 5 shows the relationship between the writing buffer and the buffer management table in the nonvolatile memory in the first embodiment.

FIG. 5 shows the relationship between the writing buffer 8 and buffer management table 9 in the volatile memory 6. The disk snapshot control section 5 does not immediately write into the disk device 4 the writing data required to be written from the file system 2 into the disk device 4, but divides the writing data into blocks and stores them sequentially in log form into the writing buffer 8. At that time, the logical addresses viewed from the file system 2 for the writing data are saved in the entry corresponding to the buffer area stored in the buffer management table 9. Then, a flag "F" is set to indicate that a data item has been assigned to the entry. Accordingly, checking the buffer management table 9 makes it possible to determine the next buffer area in which the writing data received from the file system 2 is to be stored. In FIG. 5, writing data items have been stored in the buffer areas B0 to B9 and the logical addresses for B0, B1, . . . , B9 are LA134, LA99, . . . , LA678.

Figure 6:
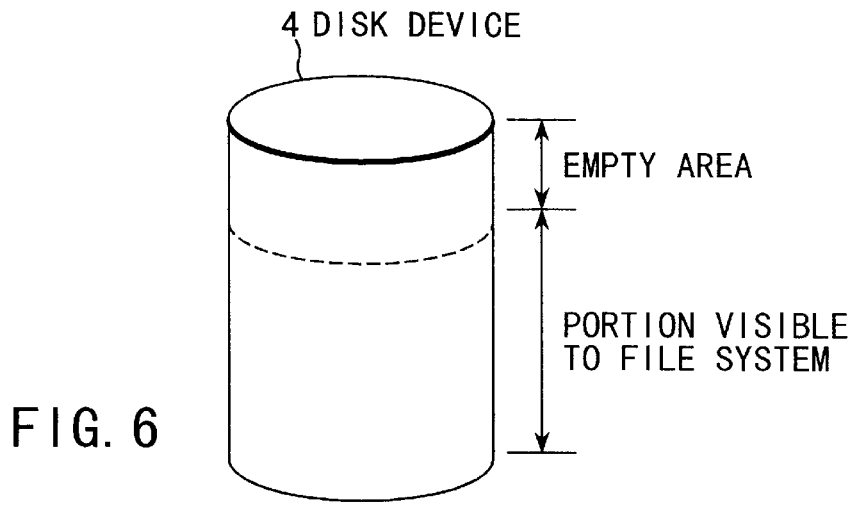
FIG. 6 shows an empty area on the disk device in the first embodiment.

Data is written into the disk device 4 in predetermined units called stripes, each stripe being an integral multiple (K) of the block size. (It is preferable that data is written into the disk device in units of the size close to one track length of the disk device.) The disk device 4 shows itself to the file system 2 as if it were a disk device with a smaller storage capacity than the total storage capacity of the disk device 4. (When the file system 2 first asks the disk device about the storage capacity, the disk device answers a storage capacity smaller than the actual one.) As a consequence, an extra storage area is secured in addition to the storage area which the file system 2 can logically read and write data from and into. Let's call the extra area an empty area (see FIG. 6). Hereinafter, let's refer to a logical disk area offered by the disk snapshot section 3 visible to the file system 2 as a logical disk device, whereas let's refer to a physical disk area actually offered by the disk device 4 as a physical disk device.

The time stamp 7 is information added when the writing data from the file system 2 is actually written into the disk device 4. It is used to judge the order of writing data items into the disk device 4. Therefore, the time stamp 9 is incremented each time the data in the writing buffer 8 is written into the disk device 4. The snapshot information 10 holds the value of the time stamp at the time of creating a snapshot.

Hereinafter, the principle of each process in the computer system of the first embodiment will be explained in detail.

First, the writing process in the computer system of the first embodiment will be explained. When the application programs 1a to 1c have written the data into files managed by the file system 2, the file system 2 produces a request to write data into the corresponding logical disk device and sends the request to the disk snapshot section 3. The disk snapshot control section 5 receives the data to be written and its logical address from the file system 2, divides them into blocks, and stores the blocks consecutively into the empty area of the writing buffer 8 on the volatile memory 6. The disk snapshot control section 5 also converts the received address (hereinafter, referred to as the logical address) for the logical disk device into the addresses for blocks and stores them into the corresponding entries on the buffer management table 9. In the case of the updated data for the data already stored in the writing buffer 8, the disk snapshot control section 5 does not store the blocks consecutively into the empty area of the writing buffer 8, but directly updates the old data in the writing buffer 8.

Figure 7:
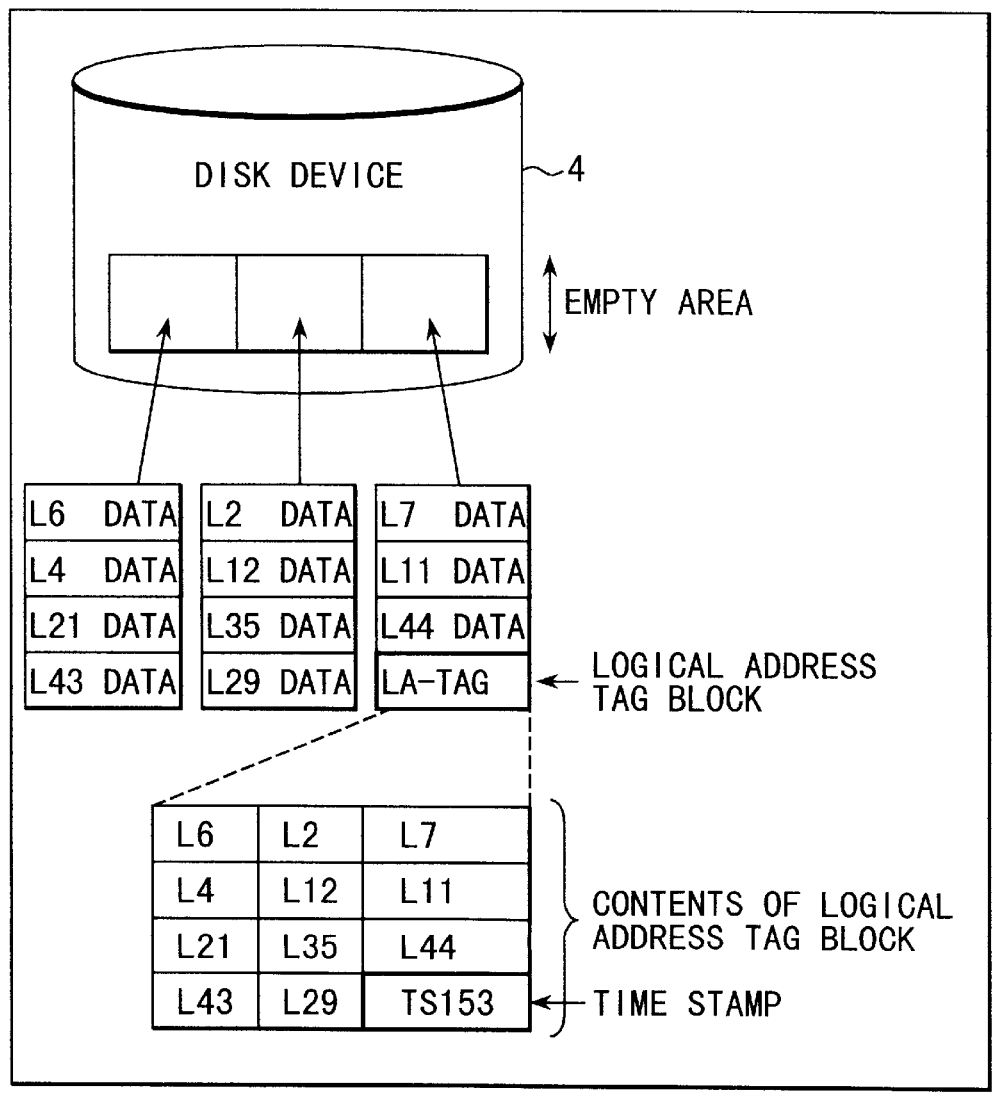
FIG. 7 is a diagram to help explain the writing process in the computer system according to the first embodiment.
Figure 8:
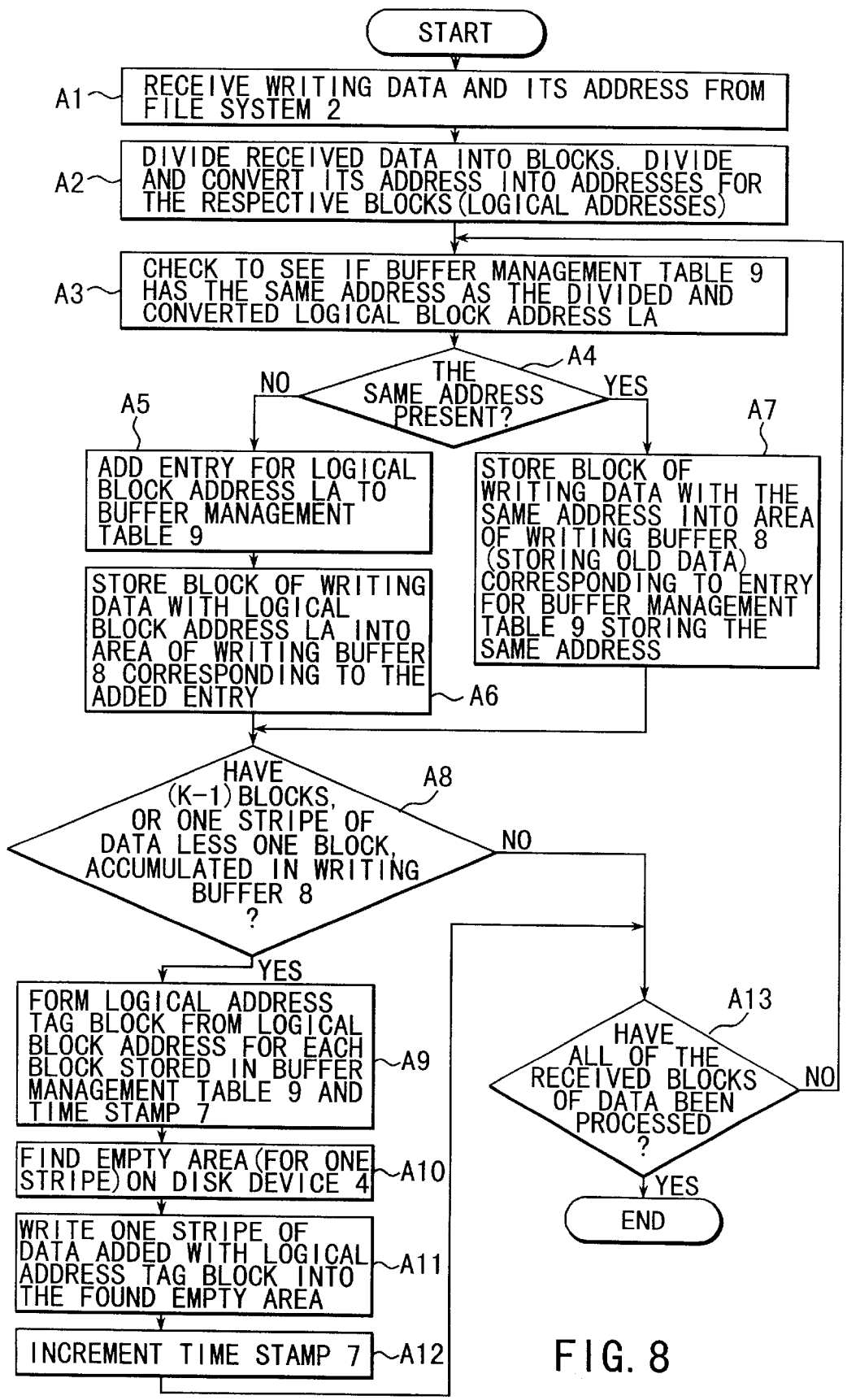
FIG. 8 is a flowchart of the procedure for the writing process in the computer system according to the first embodiment.

Then, when the data items received from the file system 2 have amounted to a stripe of data items less one block (or a K−1 number of data items) in the writing buffer 8, the disk snapshot control section 5 writes them into the disk device 4. At this time, the disk snapshot control section 5 creates a logical address tag block from the logical address for each block stored in the buffer management table 9 and the time stamp on the volatile memory 6. (The address data and data block in the logical address tag block are forced to have a one-to-one correspondence beforehand, which helps identify the logical address for each block.) Thereafter, the disk snapshot control section 5 writes one stripe of data items added with the logical address tag block into the empty area of the disk device 4 (see FIG. 7). The value of the time stamp 7 is incremented when the writing has been completed. FIG. 8 shows the procedure for the writing process in the computer system of the first embodiment.

Before explanation of the process of reading the data blocks written in this way, the process of judging an invalid block will be described.

Figure 9:
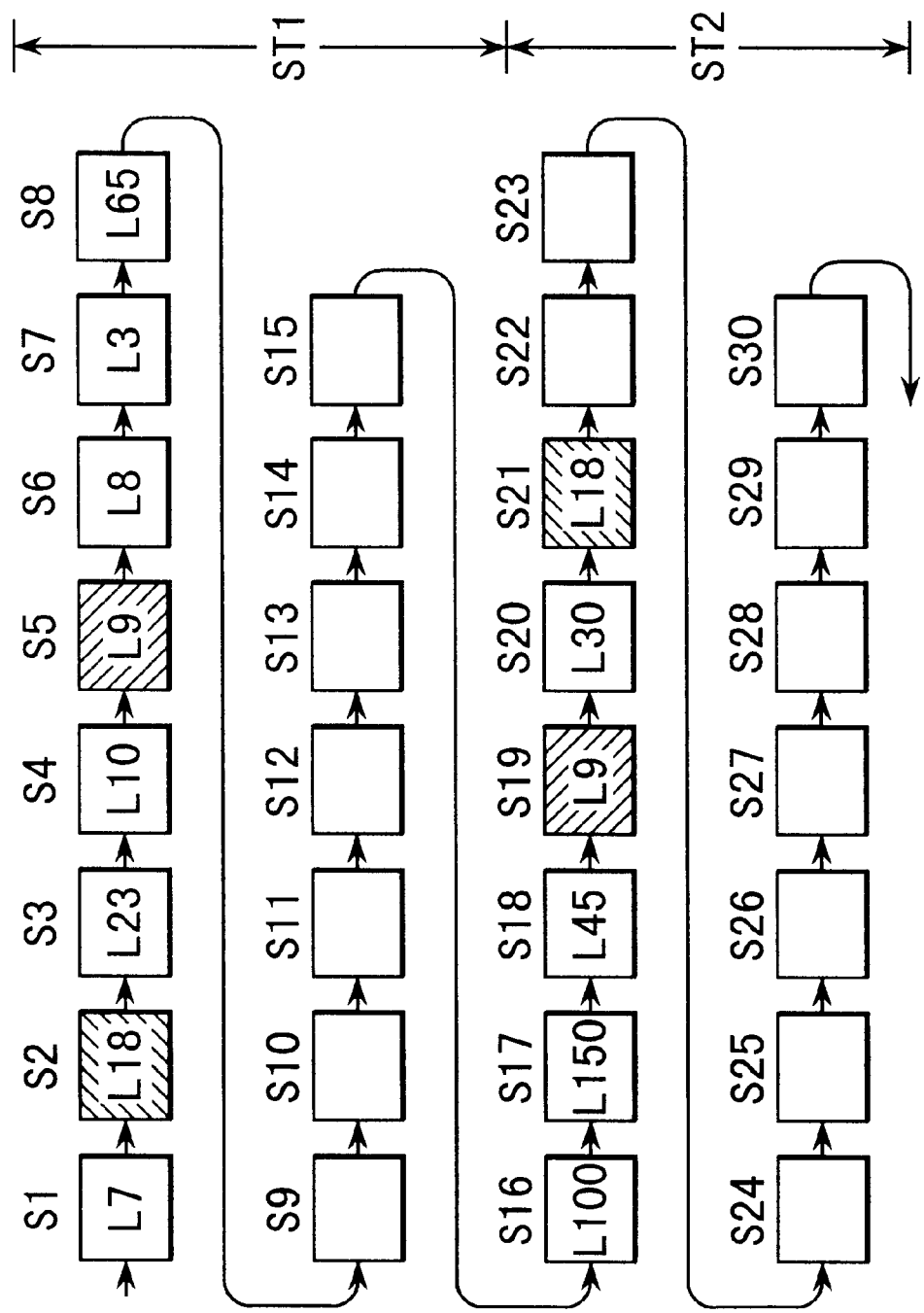
FIG. 9 is a diagram to help explain the process of judging an invalid block in the first embodiment.

Explanation will be given using a case where the file system 2 writes one block of data in the order shown in FIG. 9. In FIG. 9, Ln indicates a logical address transferred from the file system 2 and Sn represents the order of writing. In the computer system of the first embodiment, it is assumed that the writing buffer 8 can hold 15 blocks of data. In this case, the first S1 to S15 writing data items are put together into one stripe (ST1), which is then added with time stamp TS1 and written into an empty area of the disk device 4. Similarly, the S16 to S30 writing data items are put together into another stripe (ST2), which is then added with time stamp TS2 and written into another empty area of the disk device 4. Since the time stamp is incremented each time it has been written, TS1 and TS2 meets the expression: TS1<TS2.

As seen from FIG. 9, the data items in the logical addresses L9 and L18 exist repeatedly in such a manner that they appear as the blocks at S5 and S2 in the stripe with time stamp TS1 and as the blocks at S19 and S21 in the stripe with time stamp TS2. When the order of writing is considered, it has to be judged that the data blocks at S19 and S21 are valid and the data blocks at S5 and S2 are invalid. The order of writing Sn used for the sake of convenience has not been written on the actual disk device 4.

Figures 10, 11:
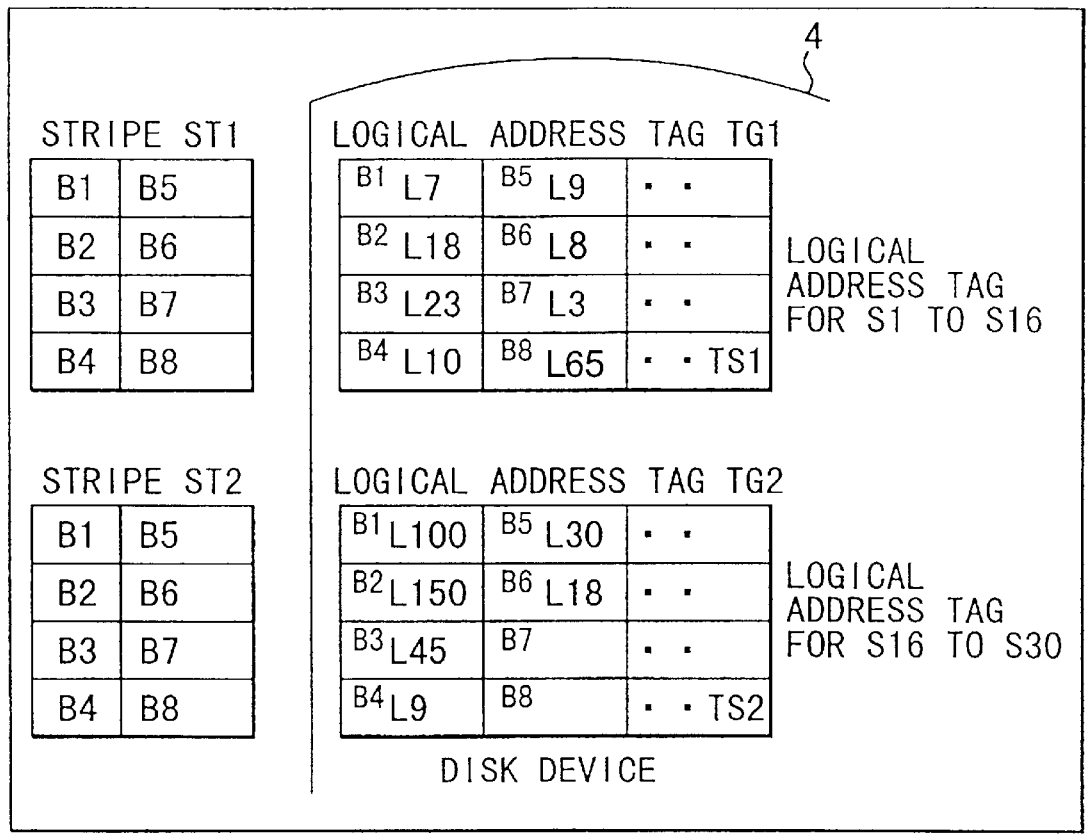
FIG. 10 shows the contents of the logical address tags TG1 and TG2 for two stripes ST1 and ST2 in the example of FIG. 9.
FIG. 11 illustrates a conversion map from logical addresses to physical addresses in the first embodiment.

In the computer system of the first embodiment, the judgment is made using a logical address tag in the stripe. FIG. 10 shows the contents of the logical address tags TG1 and TG2 for two stripes ST1 and ST2 in FIG. 9. As seen from FIG. 10, the two logical address tags TG1 and TG2 include the data in the same logical addresses L9 and L18, so either the data in blocks B5 and B2 in stripe ST1 or the data in blocks B4 and B6 in stripe ST2 is invalid. When time stamp TS1 in logical address tag TG1 is compared with time stamp TS2 in logical address tag TG2, blocks B5 and B2 in stripe ST1 are judged to be invalid because se of TS1<TS2. As described above, checking a logical address tag in the disk device 4 makes it possible to find an invalid data block.

Next, the process of reading a data block in the computer system of the first embodiment will be explained. The principle of the process is as follows: the process of judging invalid blocks is performed on the logical address tags for all of the stripes in the disk device 4 and the physical positions of the valid blocks for the remaining logical addresses required to be read are sensed.

When the process is performed each time a reading request has arrived, it takes a lot of time to read the blocks. The process is, therefore, impractical. To overcome this problem, the logical address tags for all of the stripes are checked only when the system is started up and a conversion map from logical addresses to physical addresses is created on the volatile memory 6. For the reading request from the file system 2, valid blocks are accessed using the conversion map.

This eliminates the need of always checking the address tags, preventing the performance from deteriorating seriously during a reading operation. The conversion map will be described by reference to FIG. 11. As shown in FIG. 11, the conversion map holds stripe numbers ST# in which the blocks for the individual logical addresses are stored, block numbers BLK# in the stripes, and their time stamps TS# in table form. If a logical address is given, the actual physical address is found easily from ST# and BLK# by referring to the table.

Figure 12:
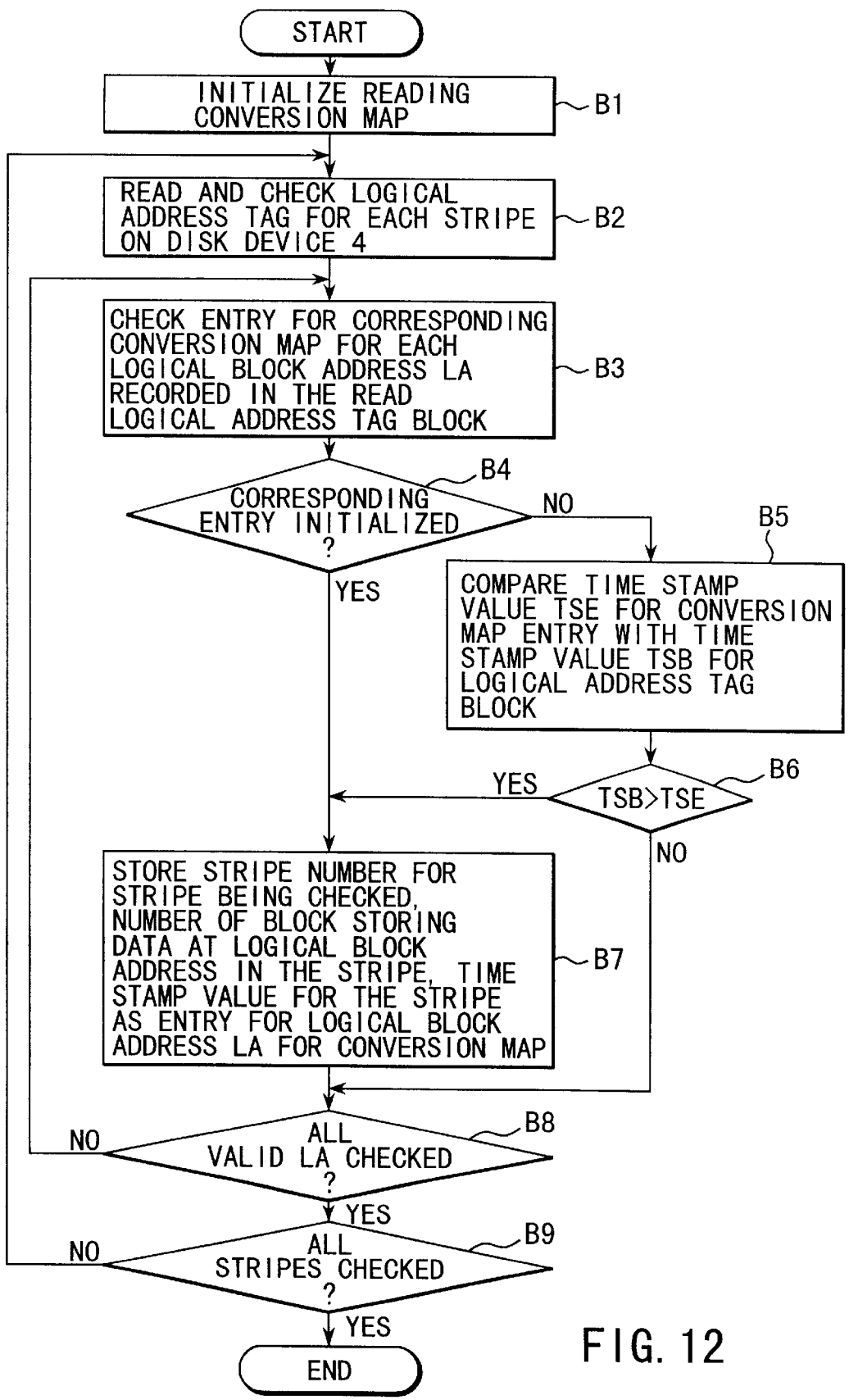
FIG. 12 is a flowchart of the procedure for the process of creating a read conversion map in the computer system according to the first embodiment.

In the creation of the conversion map at the system start-up, the block number corresponding to the stripe number is registered in the table for all of the addresses for the checked logical address tags, only when the time stamp in the table is larger than the time stamp in the logical address tag. After t he checking is effect ed for all of the stripes, a conversion map that indicate s only valid blocks is completed. The conversion map always points at valid blocks by performing a similar process on the logical address tag each time a stripe is written into the disk device 4. In this way, the conversion map is created by making a judgment whether a physical block on the disk device 4 is valid or invalid. FIG. 12 shows the procedure for the process of creating the reading conversion map.

Figure 13:
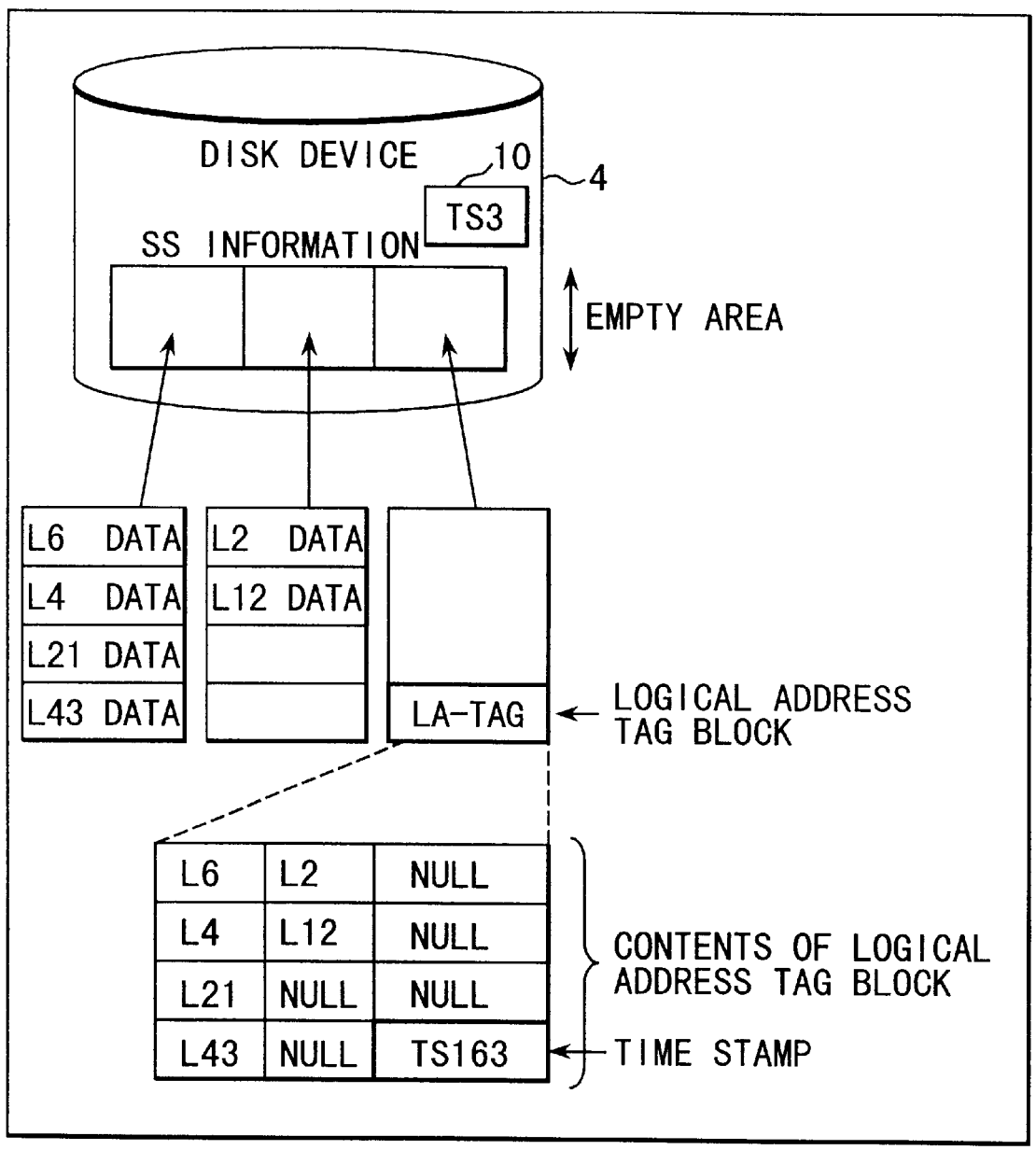
FIG. 13 is a diagram to help explain the process of creating a snapshot in the computer system according to the first embodiment.
Figure 14:
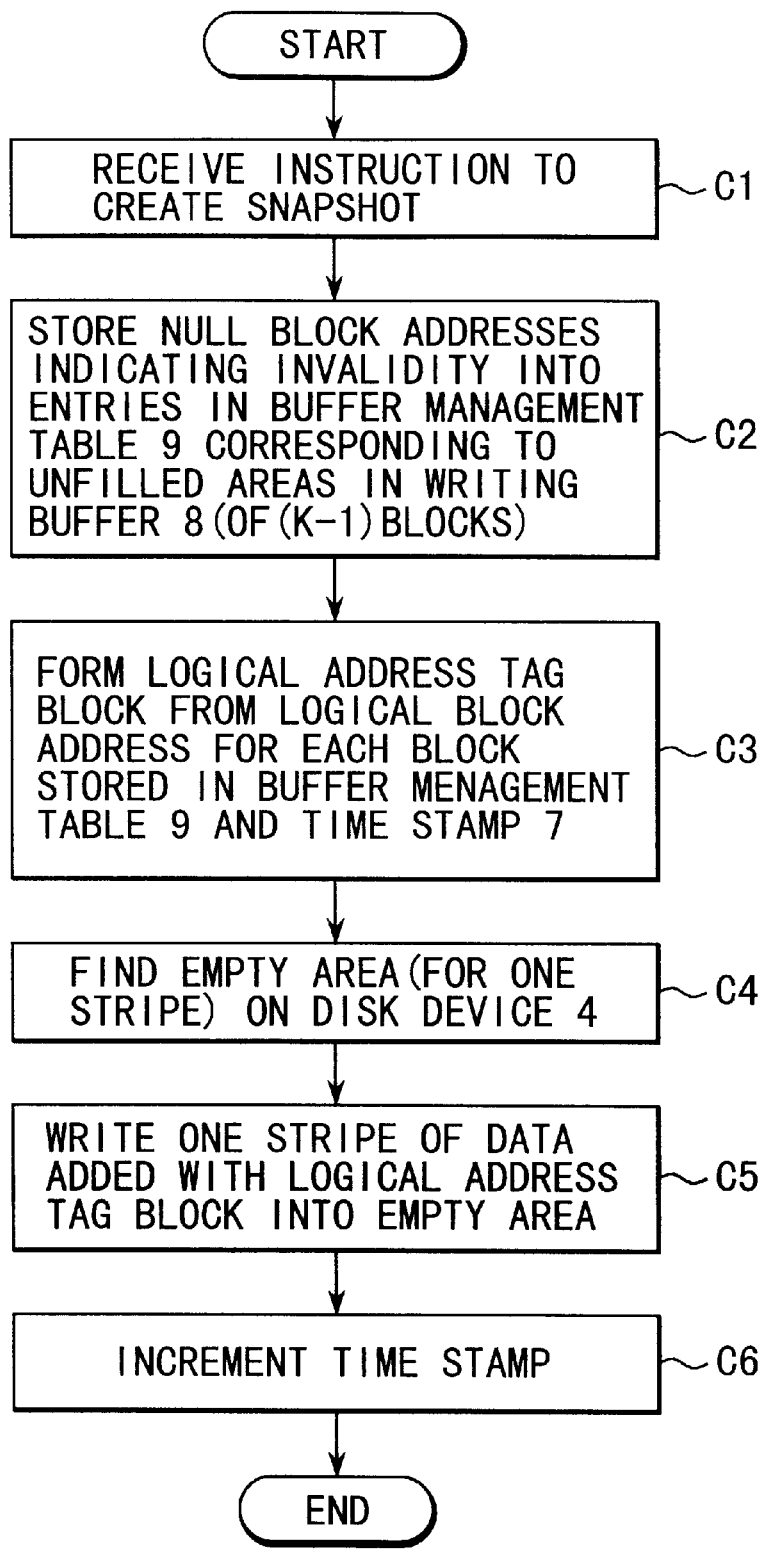
FIG. 14 is a flowchart of the procedure for the process of creating a snapshot in the computer system according to the first embodiment.

Next, the process of creating a snapshot in the computer system of the first embodiment will be explained. Receiving an instruction to create a snapshot from application programs 1a to 1c or the system manager, the disk snapshot control section 5 writes the data accumulated at that point in time into the disk device 4. Because a K−1 number of data blocks (i.e., one stripe of data less one block) have not necessarily accumulated in the writing buffer 8, null addresses indicating invalidity are stored into the buffer management table 9 corresponding to the portions of the disk which have not be filled with data items yet. As in an ordinary writing operation, a logical address tag block is created as the last write block from the logical address (including a null address) for each block stored in the write management table 7 and the time stamp on the volatile memory 6. Thereafter, a stripe of data added with the logical address tag block is put together and written simultaneously into an empty area in the disk device 4 (see FIG. 13). Furthermore, the value of the time stamp added at that time is written into the snapshot information 10 in the disk device 4 as information at the time of creating a snapshot. Then, the value of the time stamp 7 is incremented when the writing has been completed. Because the creation of a snapshot takes only the time needed to write the blocks accumulated in the writing buffer 8 and the snapshot information 10 onto the disk (and the other related processing takes a very shot time), a snapshot can be created without stopping application programs 1a to 1c as in the prior art. FIG. 14 shows the procedure for the process of creating a snapshot.

Figure 15:
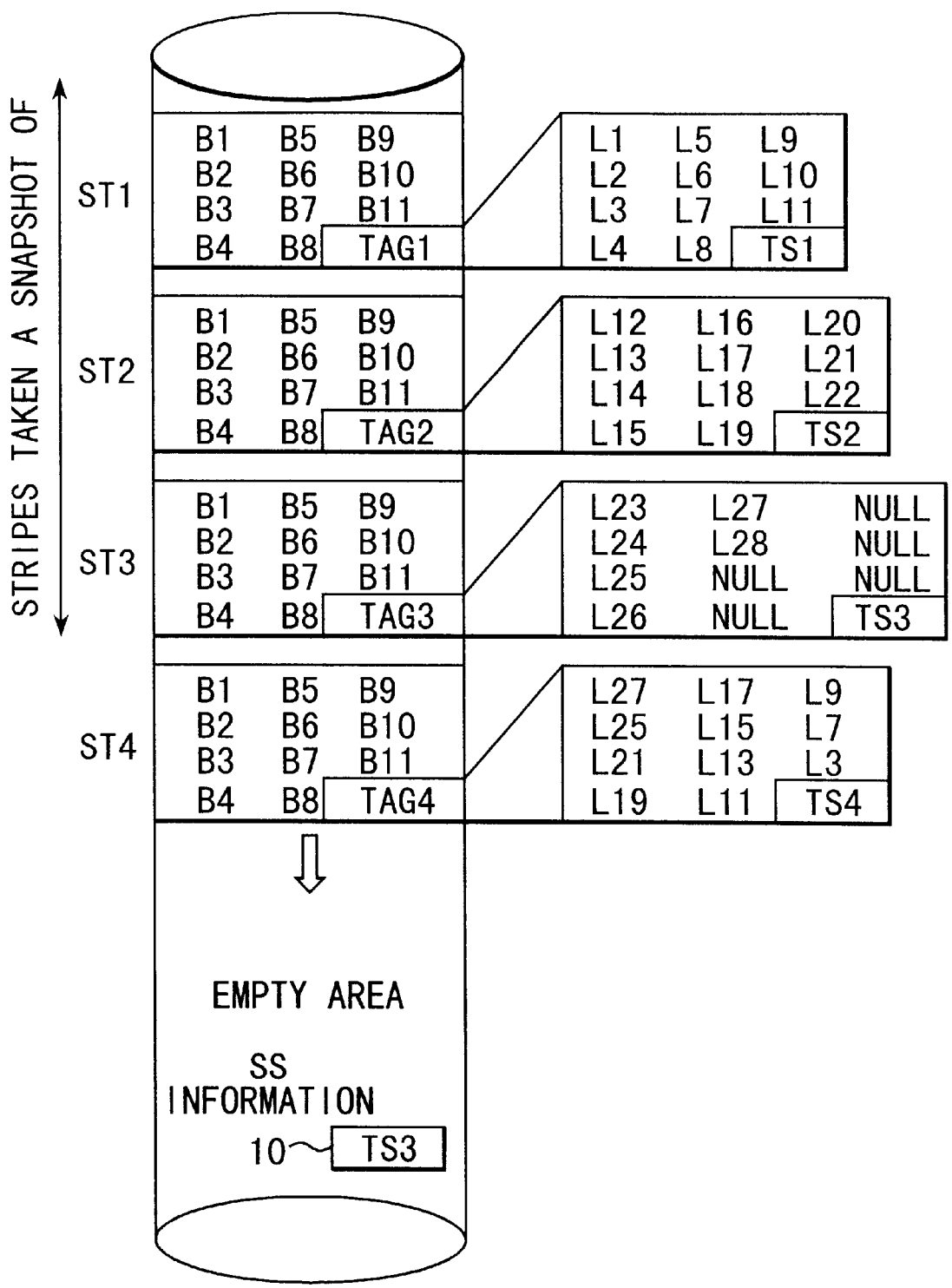
FIG. 15 is a diagram to help explain the process of referring to a snapshot in the computer system according to the first embodiment.

Next, the process of referring to a snapshot in the computer system of the first embodiment will be described by reference to FIG. 15. First, to sense the physical positions of the valid blocks for all of the logical addresses, the invalid block judging process explained in the block reading process is performed on the logical address tags for the stripes whose time stamp values in the disk device 4 are smaller than the value in the snapshot information 10. In the reading process, all of the stripes are subjected to the invalid block judgment. In the process of referring to a snapshot, however, only the stripes for which the time stamp values have been written in the snapshot information 10 are subjected to the invalid block judgment. That is, in the disk state of FIG. 15, while stripes ST1 to ST4 are subjected to the invalid block judgment in the block reading process, stripes ST1 to ST3 are subjected to the invalid block judgment in the snapshot reference process.

When the invalid block judging process is performed each time, it takes a lot of time to refer to a snapshot. The process is, therefore, impractical. As in the reading process, to overcome this problem, the logical address tag for the stripes used in first referring to a snapshot is checked and a snapshot conversion map from logical addresses to physical addresses is created on the volatile memory 6. FIG. 16 shows a snapshot conversion map and a read conversion map (with the time stamp field being omitted for simplicity's sake) in a case where the disk is in the state of FIG. 15. As seen from FIG. 16, for the blocks with logical addresses L3, L7, L9, . . . , L25, L27 updated after the creation of a snapshot, the blocks before the update can be referred to from the snapshot conversion map (FIG. 16(a)). The read conversion map (FIG. 16(b)) always points at the latest blocks. In this way, the snapshot reference conversion map and read conversion map can be created by changing stripes to be subjected to the invalid block judging process.

Figure 17:
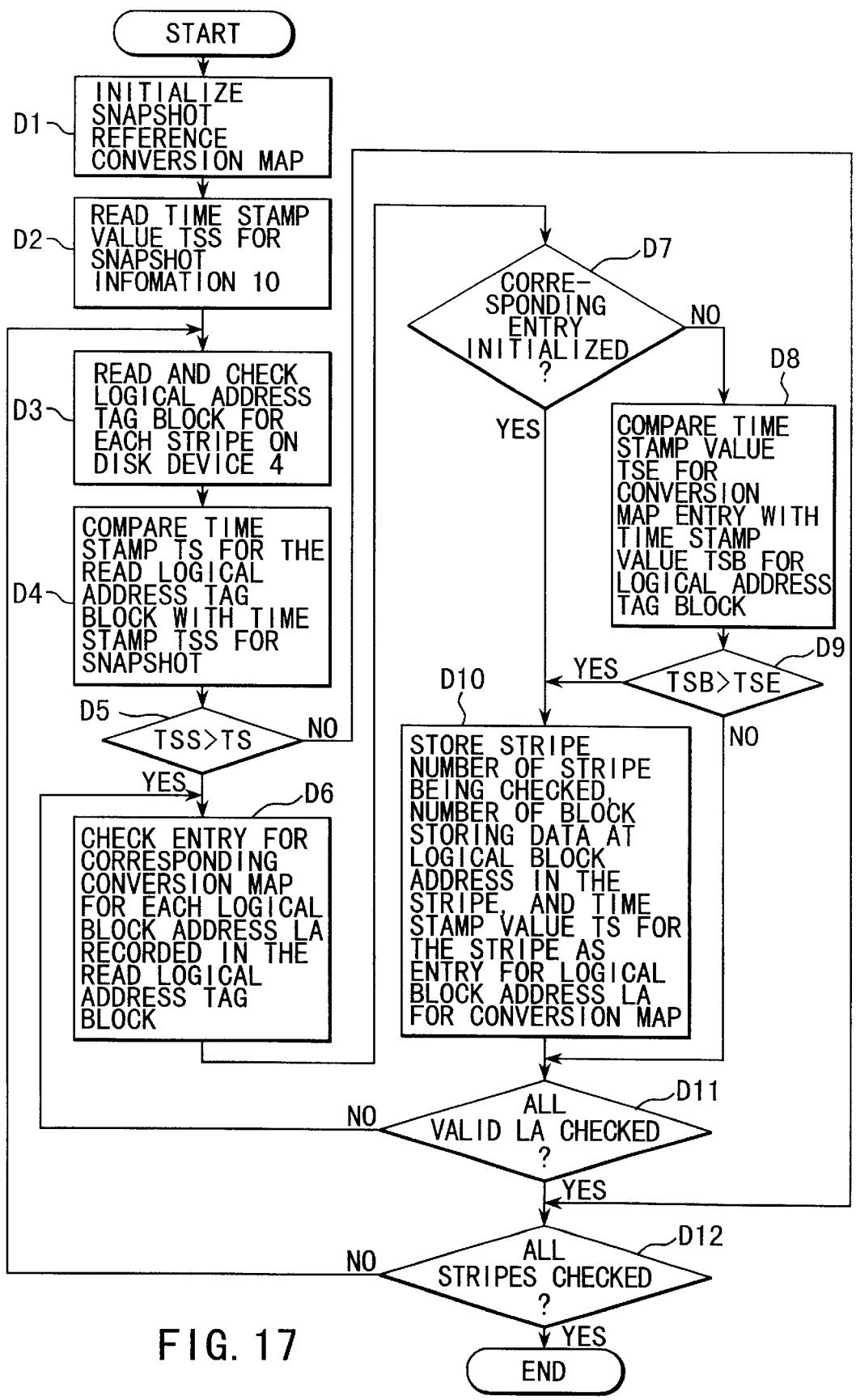
FIG. 17 is a flowchart of the procedure for the process of creating a snapshot reference conversion table in the computer system according to the first embodiment.

FIG. 17 shows the procedure for the process of creating the read conversion map.

Figure 18:
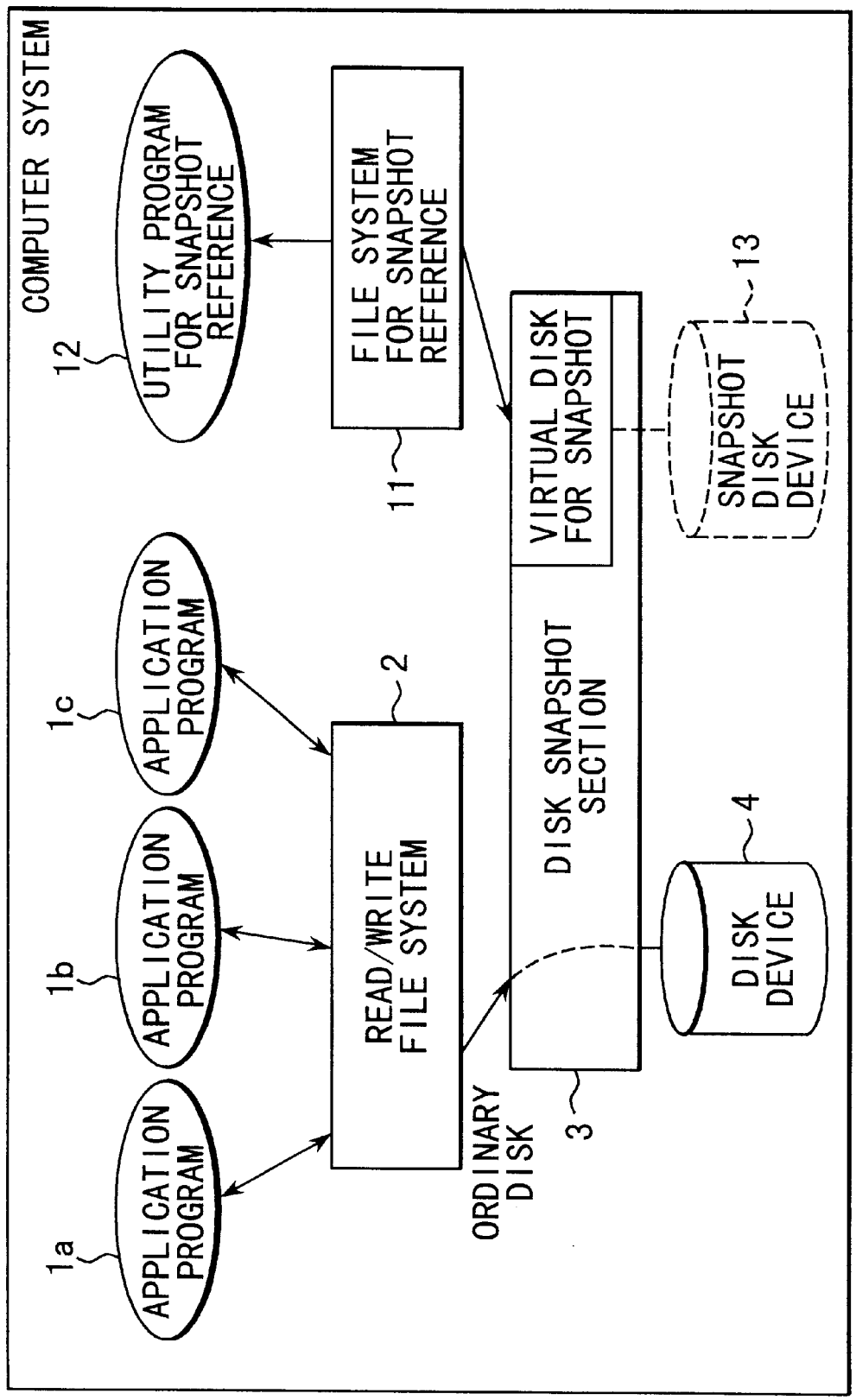
FIG. 18 is a diagram to help explain a virtual disk function that causes the disk image at the time of creating the snapshot in the disk snapshot section to appear to be a different virtual disk.

Although the disk image at the time of creating a snapshot can be referred to via the disk snapshot section 3, the file in the snapshot cannot be referred to directly. To overcome this problem, the disk snapshot section 3 is provided with a virtual disk function that shows the disk device 4 which stores the disk image at the time of creating a snapshot as another virtual disk as shown in FIG. 18. In general, an operating system has the function of sensing which file system the data stored in the disk sensed in the start-up phase belongs to and building up a corresponding file system. Sensing the virtual disk, the operating system builds up a snapshot reference file system 11 on the virtual disk to enable a snapshot reference utility program 12 to access the file at the time of creating the snapshot. A program for backing up a specific file onto magnetic tape is considered as the snapshot reference utility program 12. The virtual disk function may be provided in the form of a software driver, such as a RAM disk. Therefore, it is easy to provide the virtual disk function.

Second Embodiment

Hereinafter, a second embodiment of the present invention will be explained.

The snapshot creating process in the computer system of the first embodiment is based on the assumption that the file system 2 does not have the function of caching the updated data. That is, it has been assumed that the change of the files by application programs 1c to 1c is written into the disk device 4 immediately. Therefore, when a snapshot is created, the correct state of the file system 2 is stored by just writing the writing data accumulated in the writing buffer 8 up to that time into the disk device 4. File systems with the function of caching the updated data, such as UNIX file systems, have been widely used today. With such file systems, a snapshot cannot be created correctly, because in the process of creating a snapshot, the updated data in the cache memory has been lost.

To overcome this problem, a file system 2 has the function of caching the updated data in a computer system of the second embodiment. The process of creating a snapshot using the caching function will be explained.

Generally, a file system that caches the updated data has the function of writing all of the cached updated data into the disk device according to an instruction from an application program to assure that the change of a file by the application program is recorded reliably into the disk device. The disk snapshot section 3 of the second embodiment is provided with a conditional creation function that receives a pre-writing instruction and a post-writing instruction from application programs 1a to 1c and performs the aforementioned snapshot creation process only when data is not written from the file system 2 between the reception of the pre-writing instruction and that of the post-writing instruction.

Figure 19:
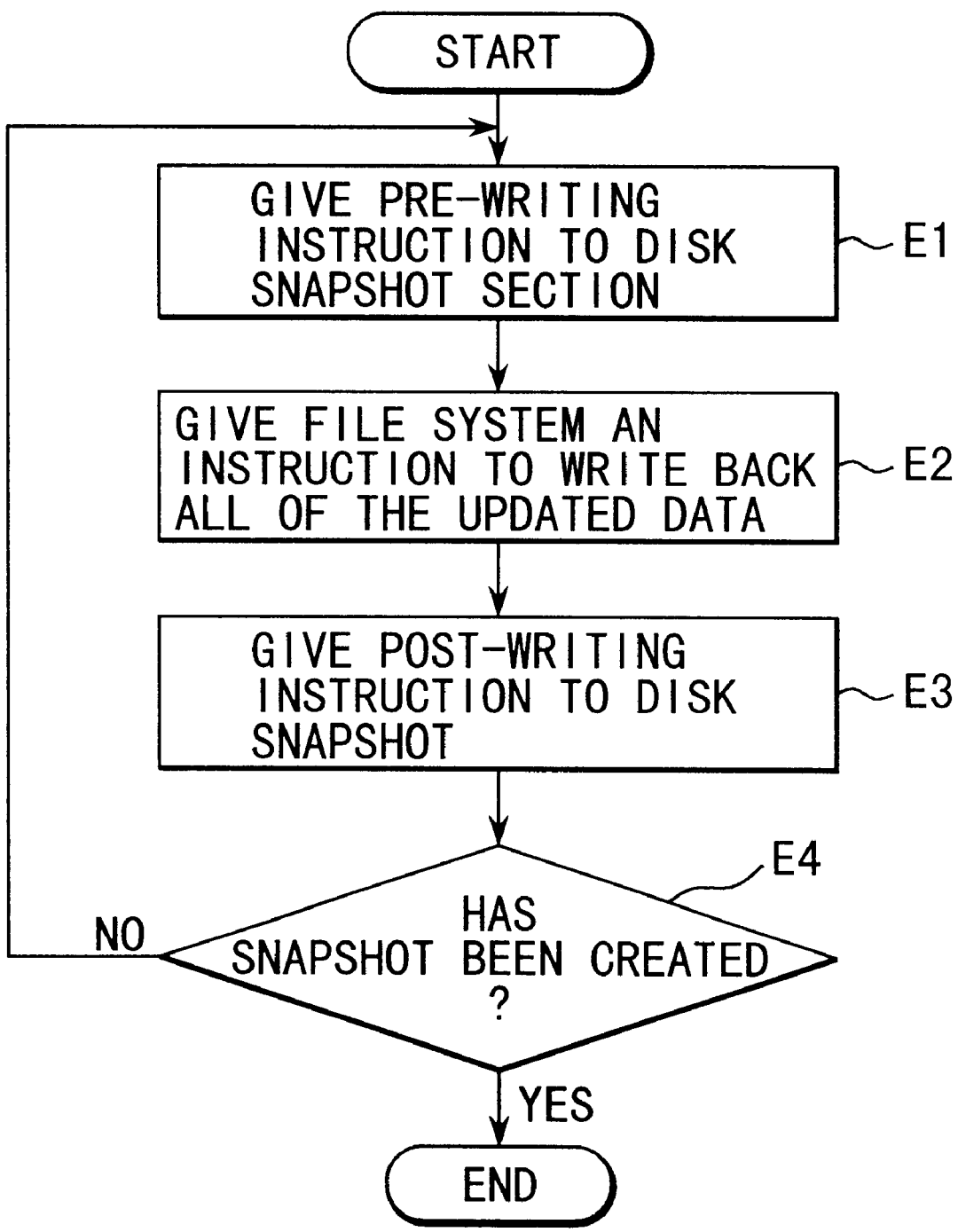
FIG. 19 is a flowchart of the procedure for the process of creating a snapshot in a computer system according to a second embodiment of the present invention.

Using the function the disk snapshot section 3 has, a snapshot where all of the updated data has been restored is created according to the instructions from application programs 1a to 1c including the procedure shown in FIG. 19. Application programs 1a to 1c first issue a pre-writing instruction to the disk snapshot section 3 to tell the latter that the file system 2 is going to restore the data (step E1). Next, they instruct the file system 2 to write back all of the cached updated data into the disk device 4 (step E2). Receiving the instruction, the file system 2 writes back all of the updated data into the disk device and, when completing the execution, tells application programs 1a to 1c that the execution has been completed. Receiving the notice of the completion of the writing back operation from the file system 2, application programs 1a to 1c issue a post-writing instruction to the disk snapshot section 3 (step E3).

Then, receiving the instruction, the disk snapshot section 3 performs the snapshot creation process only when the file system 2 writes nothing during the time from the issue of the pre-writing instruction to that of the post-writing instruction. In response to the post-writing instruction, the disk snapshot section 3 returns whether or not a snapshot has been created to application programs 1a to 1c. When the disk snapshot section 3 has not created a snapshot (NO at step E4), application programs 1a to 1c repeat the processes all over again (step E1 to step E3). When the disk snapshot section 3 has created a snapshot (YES at step E4), application programs 1a to 1c complete the present process.

The above processes assures that the file system 2 has no data to be written into the disk device 4 even if it is instructed to write back the data, or that the correct state of the file system 2 has been already stored in the disk device 4. This enables the disk snapshot section 3 to create a correct snapshot. When an instruction to restore the data is simply given to the file system 2 and an instruction to create a snapshot is simply given to the disk snapshot section 3, if a file is updated between the issues of these two instructions, part of the updated data will be left in the cache. Therefore, there is the danger of being unable to create a correct snapshot. To avoid the danger, the procedure described above is needed.

Third Embodiment

Hereinafter, a third embodiment of the present invention will be explained.

While in the computer system of the first embodiment, only one snapshot can be created, more than one snapshot is created in the computer system of the third embodiment.

The third embodiment differs from the first embodiment in that the snapshot information 10 on the disk device 4 has such a structure as holds the time stamp for each snapshot.

Figure 20:
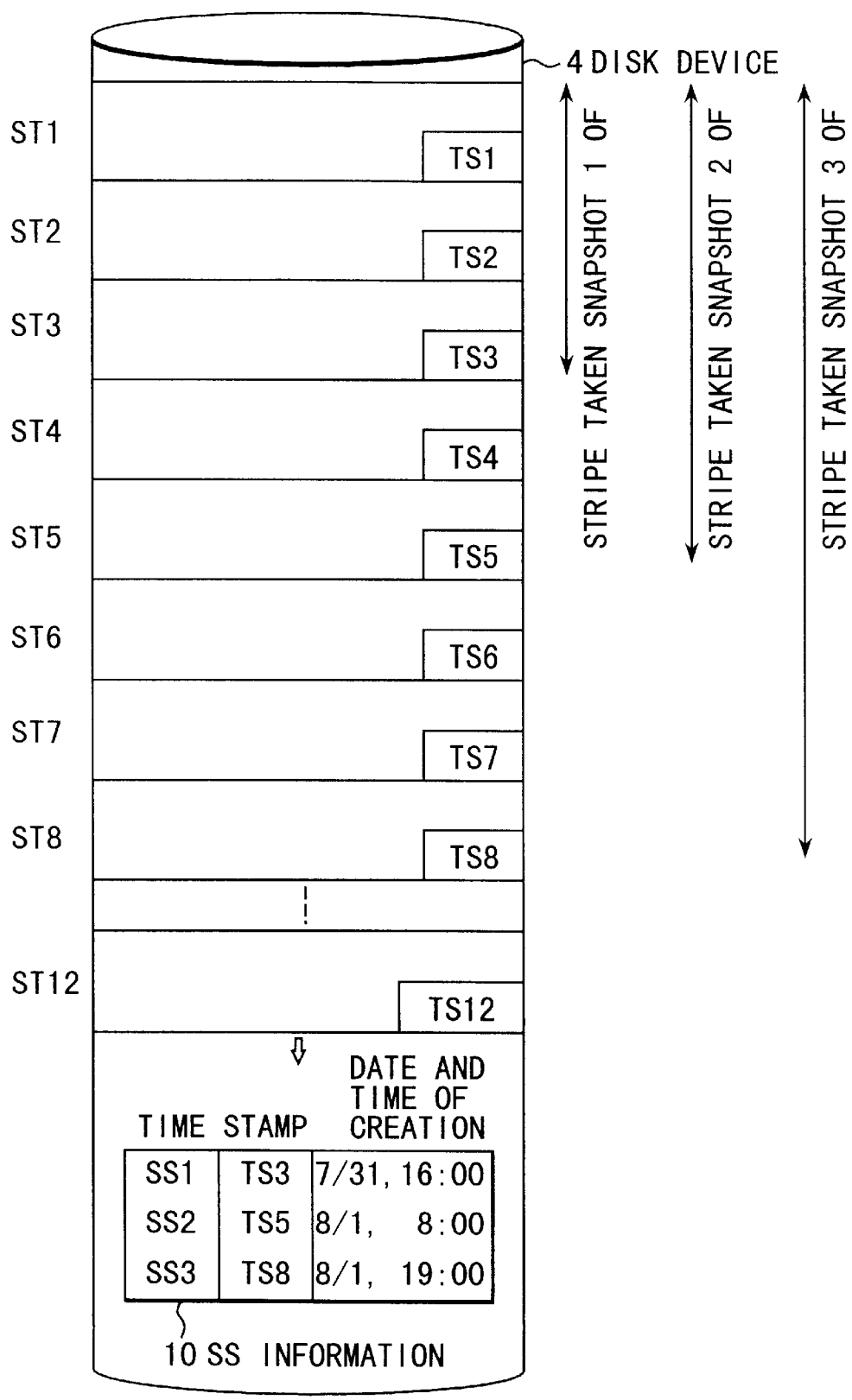
FIG. 20 shows snapshot information in a computer system according to a third embodiment of the present invention.

The process of creating a snapshot in the third embodiment is the same as that in the first embodiment in that the data items accumulated at that point in time are written, except that the time stamp value for the written stripe is stored into the disk device 4 as snapshot information 10 about the snapshot (SS). For example, when stripe 3 (ST3) of FIG. 20 is written in the snapshot creation process, its time stamp value TS3 is stored as snapshot information 10 about snapshot 1 (SS1). Similarly, when stripe 5 (ST5) is written in the snapshot creation process, its time stamp value TS5 is stored as snapshot information 10 about snapshot 2 (SS2). When stripe 8 (ST8) is written in the snapshot creation process, its time stamp value TS8 is stored as snapshot information 10 about snapshot 3 (SS3).

In the snapshot reference process, the basic processing is the same as that in the first embodiment expect that the target stripes differ from one snapshot to another to be referred to. For example, when snapshot 2 (SS2) is referred to, it is seen from the time stamp value TS5 in snapshot information 10 that ST1 to ST5 are target stripes. Then, the invalid block judging process and the process of creating a snapshot reference conversion map are executed by just checking only stripes ST1 to ST5. To refer to snapshot SS2, the data at the time of creating a snapshot is accessed referring to the conversion map. Similarly, when snapshots SS1 and SS3 are referred to, it is seen from their time stamp values TS3 and TS8 that ST1 to ST3 and ST1 to ST8 are target stripes. Then, the invalid block judging process and the process of creating a snapshot reference conversion map are performed on only the target stripes. The data at the time of creating each snapshot is accessed using the conversion map.

As described above, more than one snapshot can be dealt with by simply storing more than one time stamp value as snapshot information 10.

Next, explanation will be given of methods of causing a snapshot reference utility program 12 to access more than one snapshot created by the disk snapshot section 3.

Figure 21:
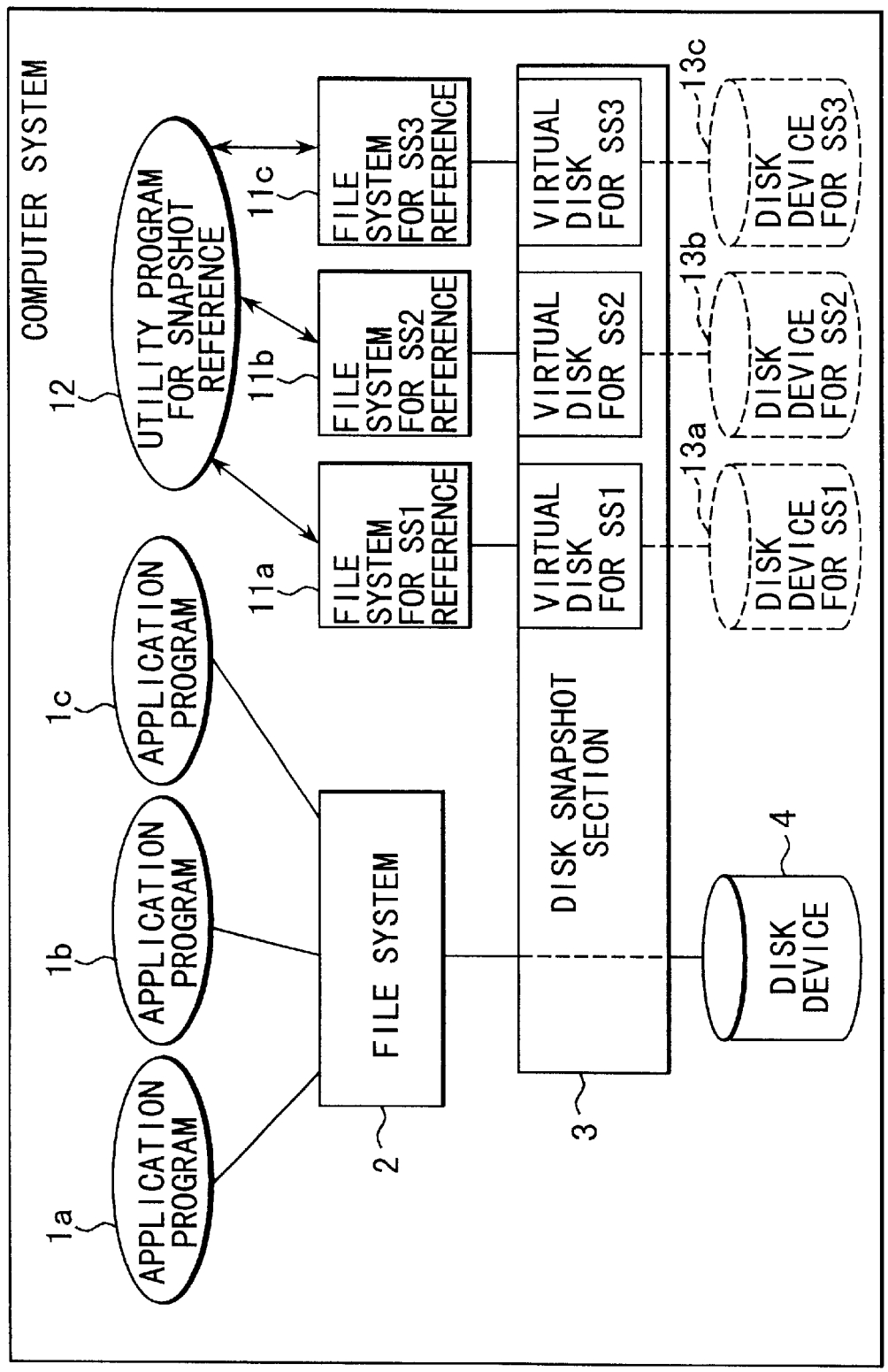
FIG. 21 is a diagram to help explain a first method of causing an application program to access snapshots in the third embodiment.

In a first method, as shown in FIG. 21, the disk snapshot section 3 is provided with the function of showing the corresponding virtual disk devices 13a to 13c for each created snapshot and building snapshot reference file systems 11a to 11c on the respective virtual disk devices 13a to 13c. Then, the snapshot reference utility program 12 provides an access to the data at the time of creating a snapshot by way of the corresponding snapshot reference file systems 11a to 11c. With this method, as the number of snapshots increases, the number of virtual disks also increases. Many operating systems have the upper limit on the number of disks visible to programs, such as Microsoft Windows. Therefore, in the case of the method that permits the number of virtual disk devices 13a to 13c to increase, some of the disk devices cannot be used more often because of the limit. The larger the number of disks visible to the programs, the more difficult it is to manage the computer system.

Figure 22:
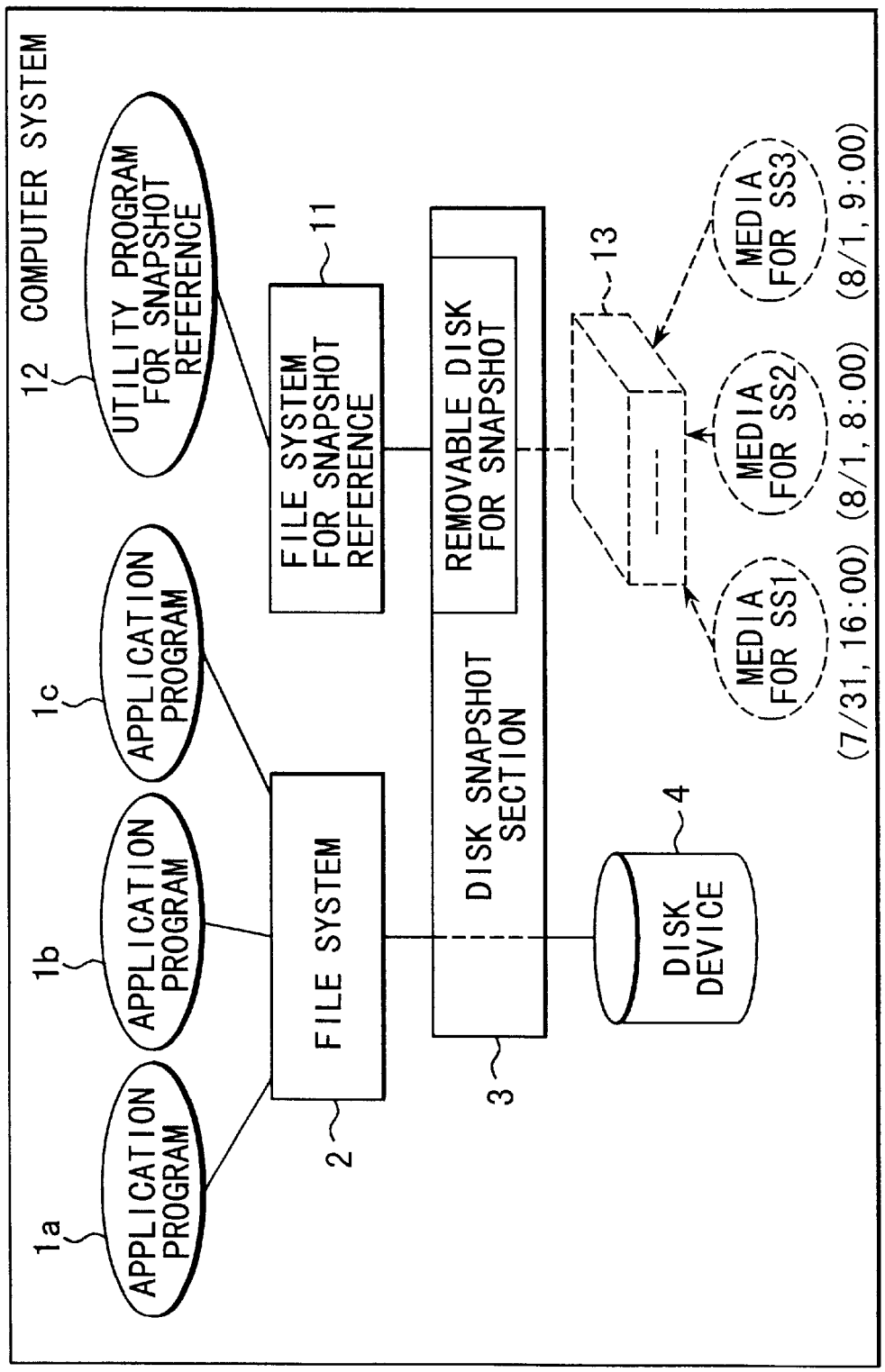
FIG. 22 is a diagram to help explain a second method of causing an application program to access snapshots in the third embodiment.

To overcome this problem, in a second method, the disk snapshot section 3 is provided with the function of offering a virtual removable disk 13 for snapshots as shown in FIG. 22 and each snapshot is treated as virtual media for the virtual removable disk. Because this method requires only one virtual disk device 13, such a problem as encountered in the first method will not arise. Although in this method, snapshots cannot be accessed simultaneously, no serious problem will possibly arise, because snapshots are accessed at the same time less often. Furthermore, snapshots can be accessed simultaneously by copying the necessary files of each snapshot into the latest disk image.

In an operating system supporting a removable disk, when media are changed, the file system is generally reconstructed automatically according to the change. To change the snapshot from SS1 to SS2, the virtual removable disk 13 informs the snapshot reference file system 11 and operating system that the media have been changed. Then, to access the changed media, the operating system ends the snapshot reference file system 11 that has been accessing snapshot SS1 and starts the snapshot reference file system 11 for the changed media. Being accessed by the newly started snapshot reference file system 11, the virtual removable disk of the disk snapshot section 3 returns the disk image of snapshot SS2, which enables the snapshot reference utility program 12 to access the file in snapshot SS2. At the system start-up, the operating system asks the disk snapshot section 3 whether or not the disk (including a virtual disk) is removable. At that time, the disk snapshot section 3 informs the operating system that the disk is removable.

What the disk snapshot section 3 does to treat a disk storing snapshots as a virtual removable disk is summarized as follows:

(1) Returns information that the disk is removable in response to the inquiry made by the operating system at system start-up (2) Receives a snapshot change instruction from the user or an application program (3) In response to the snapshot change instruction, informs the file system and operating system that the media have been changed (4) Enables the operating system or file system to access the image of the snapshot specified by the user or the application program, when the operating system or file system attempts to access the changed media.

With the first and second methods, however, the disk used to create a snapshot visible to the operating system or various programs, including the snapshot reference utility program 12, differs from the disk device at the time of referring the snapshot. For example, in FIG. 21, it seems to such an operating system as Windows that the disk device 4 is the "C:" drive and virtual disk SS1 is the "D:" drive. Therefore, for environmental variables, even if A file in "C:" drive is specified for a file name that each program should use, each program will not operate properly unless A file in "D:" drive is specified in referring to a snapshot. Similarly, even if B file in "C:" drive is specified for a file name related to a certain process in the file in a snapshot, each program will not operate properly unless B file in "D:" drive in referring to the snapshot.

As described above, when the disk device visible to the operating system and various programs has differed, the programs often operate improperly unless the environmental variables and the contents of the files are modified accordingly. Usually, which files or environmental variables should be changed is unknown. It is much work to change the contents of the files and the environmental variables each time a snapshot is referred to.

Figure 23:
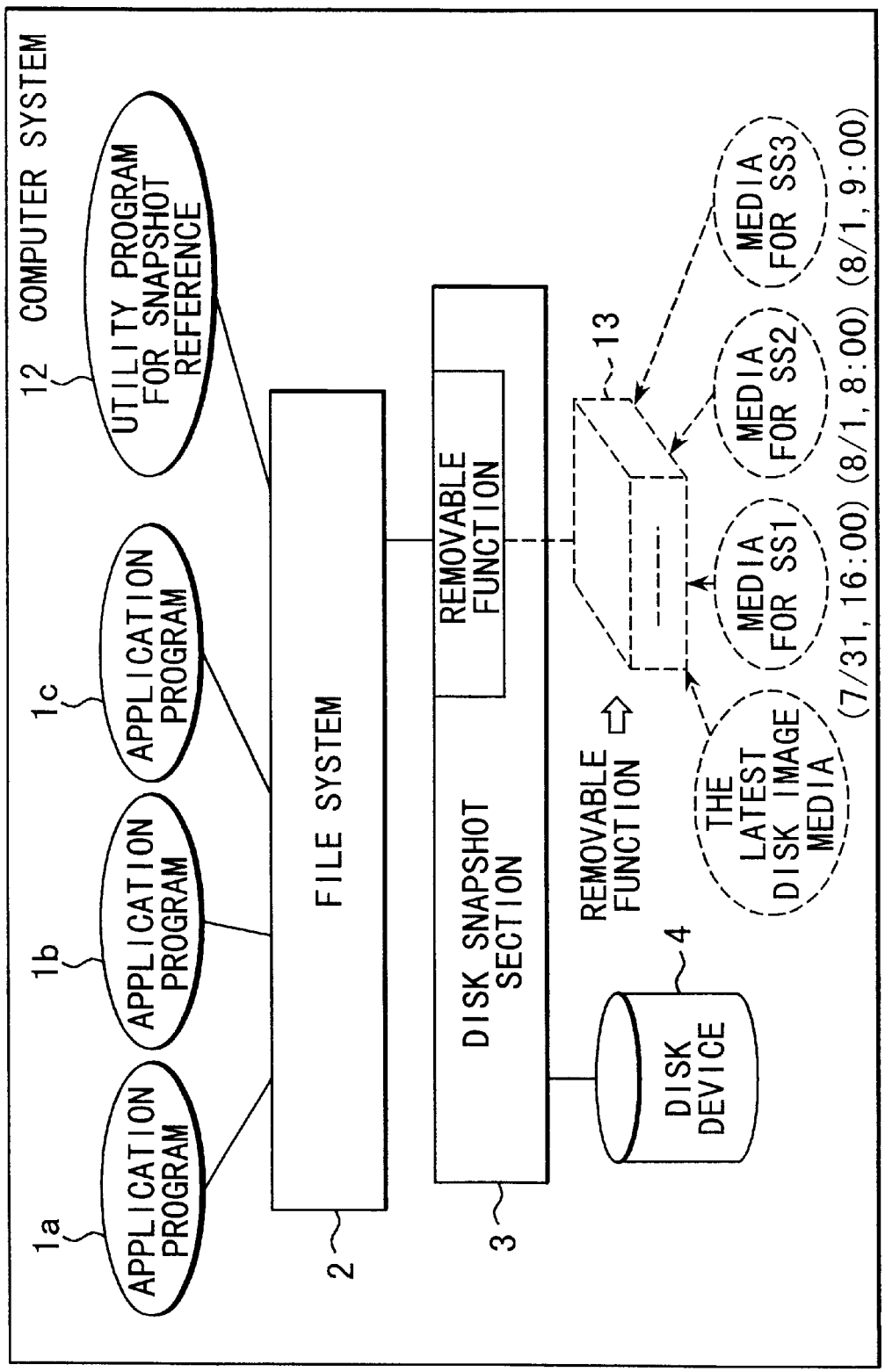
FIG. 23 is a diagram to help explain a third method of causing an application program to access snapshots in the third embodiment.

To overcome this problem, in a third method, as shown in FIG. 23, the disk snapshot section 3 is provided with the making-removable function of causing the disk device 4 to appear to the operating system, file system, and various program to have a removable function. The latest disk image and more than one snap shot are treated as different virtual media. With this method, because the latest image at the time of creating a snapshot differs from the image of the snapshot in only the virtual media, the same disk is visible to the operating system and various program. As a result, the problems encountered in the first and second methods will not arise. Although in the third method, the latest disk image and snapshot cannot be accessed simultaneously, there is no problem, because more than one program that needs a disk or a file name cannot be executed at the same time.

As described earlier, at system start-up, the operating system asks about whether or not the disk device (including a virtual disk) is removable. To make the disk device 4 removable, the inquiry made by the operating system to the disk device 4 is picked up in the middle of its transmission and information that it is removable is returned. To change the latest disk image or snapshot, the procedure for changing media explained in the second method is used.

Now, the way of referring to a snapshot in the system disk will be considered. If the operating system is started using the snapshot image in the system disk, the past state of the operating system at the time of creating the snapshot will be able to be reproduced, which will be a great help in dealing with trouble. The system disk is a disk on which the operating system code needed for the operating system to operate, device drivers, and swap files are stored. The system disk has to allow constant access while the system is in operation. Therefore, the system disk cannot be used as a removable disk inaccessible during the execution of the system. As a consequence, the second and third methods are inapplicable to the system disk. The system disk is often assigned a determined drive, such as "C:" drive, the first and second methods where the disks visible to the operating system differ are inapplicable to the system disk.

Figure 24:
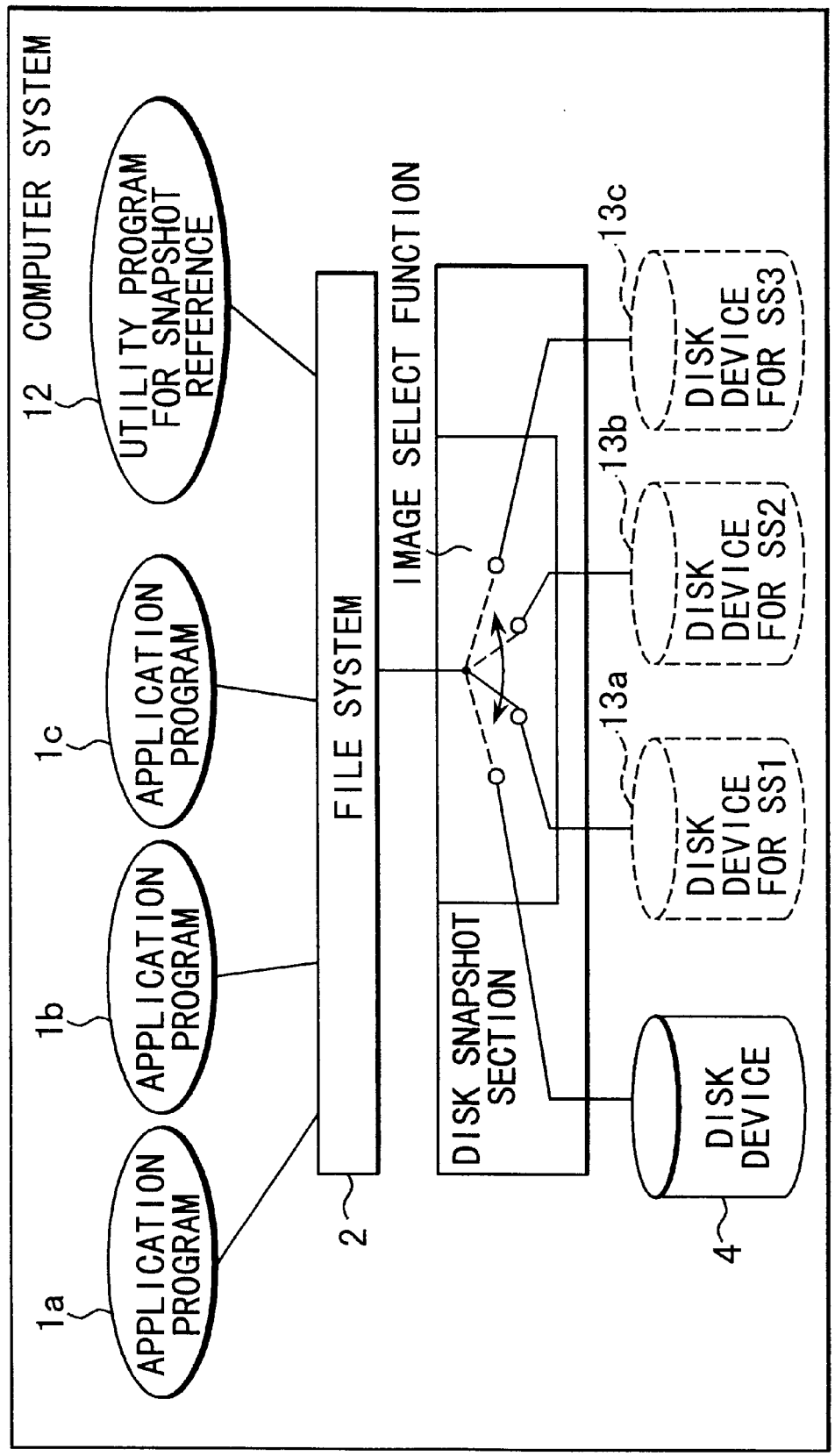
FIG. 24 is a diagram to help explain a fourth method of causing an application program to access snapshots in the third embodiment.

To overcome this problem, in a fourth method, as shown in FIG. 24, the disk snapshot section 3 is provided with an image selecting function that makes the snapshot selected at the time of system start-up visible to the operating system and file system. This enables any snapshot to be selected at the time of system start-up. Because the selected disk image remains unchanged during the execution of the system, it can be accessed. Furthermore, because the drives visible to the operating system and application programs are the same as those when the snapshot was created, even if the system disk has been assigned a predetermined drive, such as "C:" drive, there will be no problem.

Figure 25:
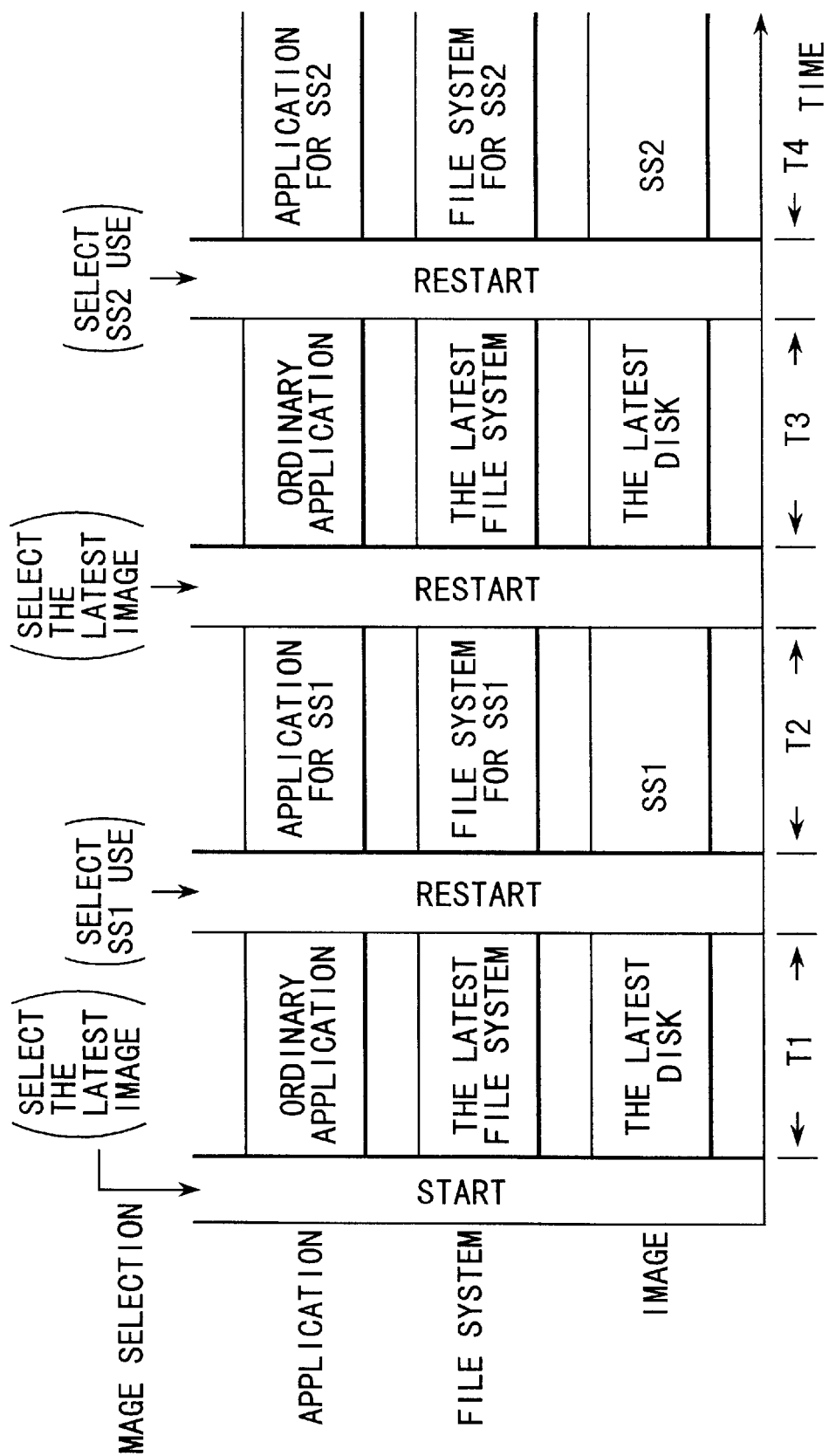
FIG. 25 is a time chart to help explain an example of operating a computer system by the fourth method of causing an application program to access snapshots in the third embodiment.

FIG. 25 illustrates an example of operating the computer system by the fourth method. To execute an ordinary application program, the user selects the latest disk image using the image selecting function of the disk snapshot section 3 and carries out the start-up process. This causes the latest file system corresponding to the latest disk image to be constructed, which allows an ordinary application program to be executed (T1). To execute an application program for snapshot SS1, the system currently being executed is terminated and the then system is restarted. At the restart, the user selects snapshot SSi as a disk image using the image selecting function of the disk snapshot section 3. This causes a SS1 file system corresponding to snapshot SS1 to be constructed, which allows an application program accessing a file in snapshot SS1 to be executed (T2). To execute an ordinary application program, the system is restarted and the user selects the latest disk image at the restart.

While in FIG. 25, it was only at the system start-up that the user selected the image, the disk snapshot section 3 may be provided with a next-recording function that records an image to be selected at the next system start-up and the image selecting function may select the image recorded by the next-recording function. This enables not only the user but also an pplication program (e.g., an application program executed at intervals of T1) to select the image at the time of an event other than system start-up. The next recording function is realized by a simple program that stores the image to be selected in the place predetermined by the disk device 4, reads the information at system start-up, and informs the image selecting function of the information.

Finally, the first to fourth methods that allows an application program to access a snapshot may be combined to suit applications.

SS1 to SS3 have been used as identification information for snapshots. They are insufficient to determine when a snapshot was created. It often becomes clear that another snapshot should have been referred to, after a snapshot was referred to. To overcome this problem, as shown in FIG. 20, a field for holding the date and time when the snapshot was created is prepared as snapshot information 10. Then, the disk snapshot section 3 records not only the time stamp at the time of creating the snapshot but also the date and time in the snapshot information. By using the date and time as identification information for the virtual disk or virtual media corresponding to the snapshot, it is possible to easily determine when the snapshot was created, which enables an efficient operation of snapshots.

Forth Embodiment

Hereinafter, a forth embodiment of the present invention will be explained.

Figure 26:
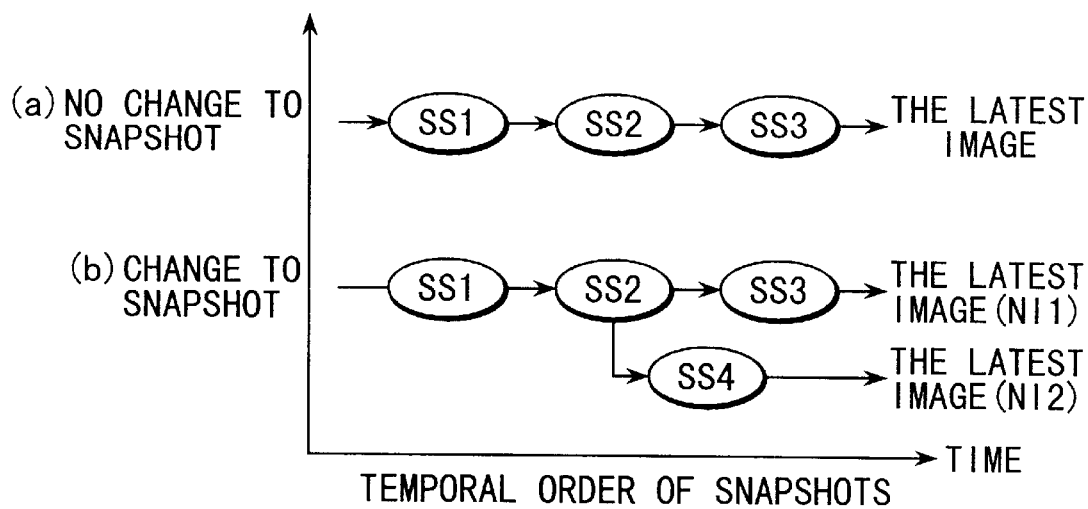
FIG. 26 is a diagram to help explain the change of a snapshot in the computer system according to a fourth embodiment of the present invention.

The first to third embodiments are based on the assumption that a created snapshot can be referred to but not be changed. As shown in FIG. 26(*a*), the snapshots are arranged in a line in the order of time at which each of them was created, with the first one being the latest disk image. In the case of a snapshot in the system disk, a file is created, modified, or deleted in the course of starting up the operating system or executing the operating system. Moreover, when an application program, such as groupware or DBMS, accesses a file in a snapshot, information that the application program is in operation is written into the file. Even if the next snapshot is created using the system started from an old snapshot, the next snapshot has a different image from the latest image before the return to the old snapshot. In this case, the latest image before the return to the old snapshot may also be referred to. Specifically, as shown in FIG. 26(*b*), after snapshots SS1, SS2, and SS3 have been created in that order, a modification greatly different from the modification to SS3 must be made in the system restarted at the time of creating snapshot SS2 and snapshot SS4 for the just made modification must be created. Furthermore, as shown in FIG. 26(*b*), it is necessary to access more than one latest disk image in parallel.

Hereinafter, a method of modifying a snapshot will be described.

Figure 27:
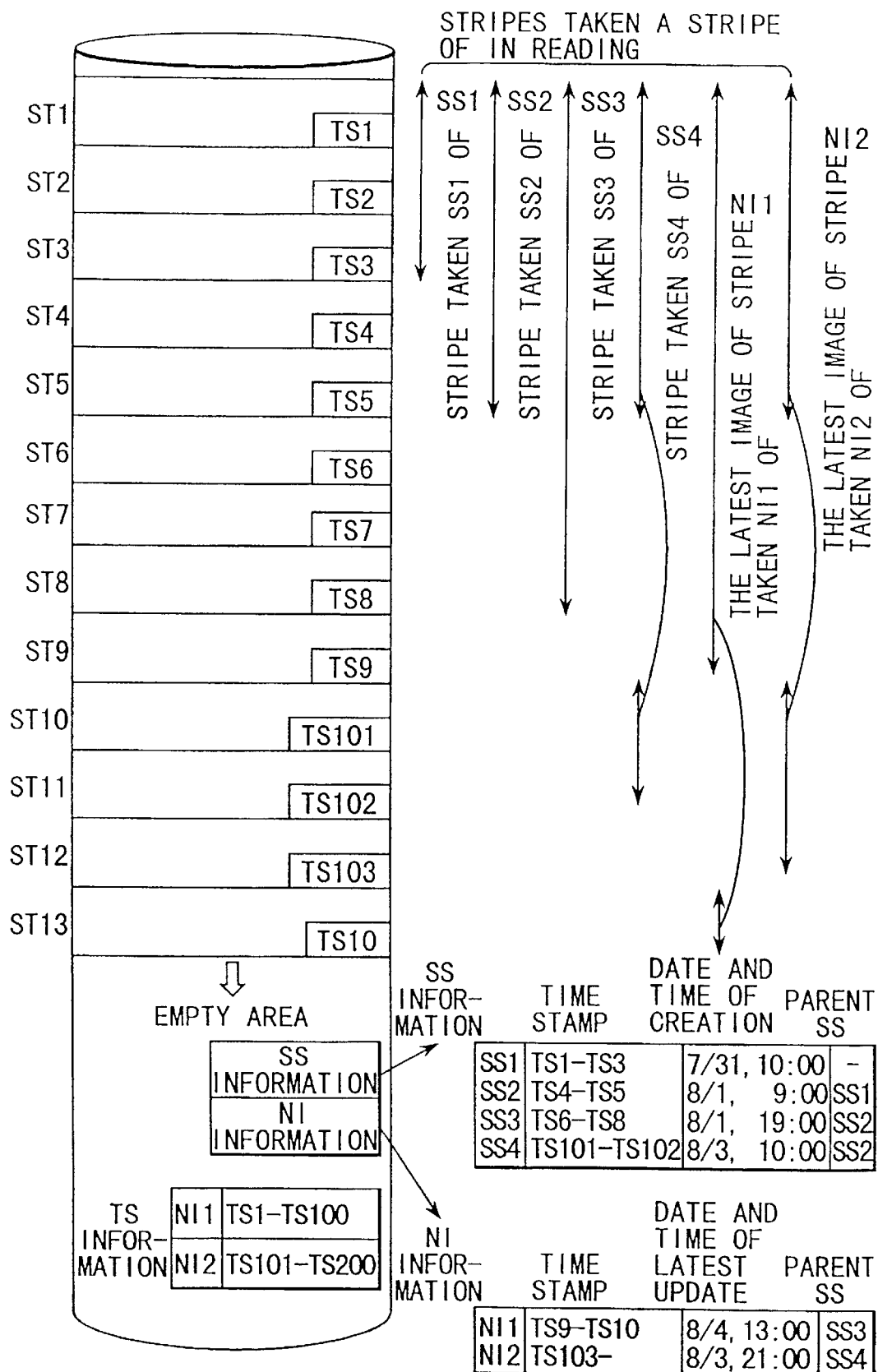
FIG. 27 is a diagram to help explain the snapshot information, latest image information, and time stamp information after the change of a snapshot in the fourth embodiment.
Figure 29:
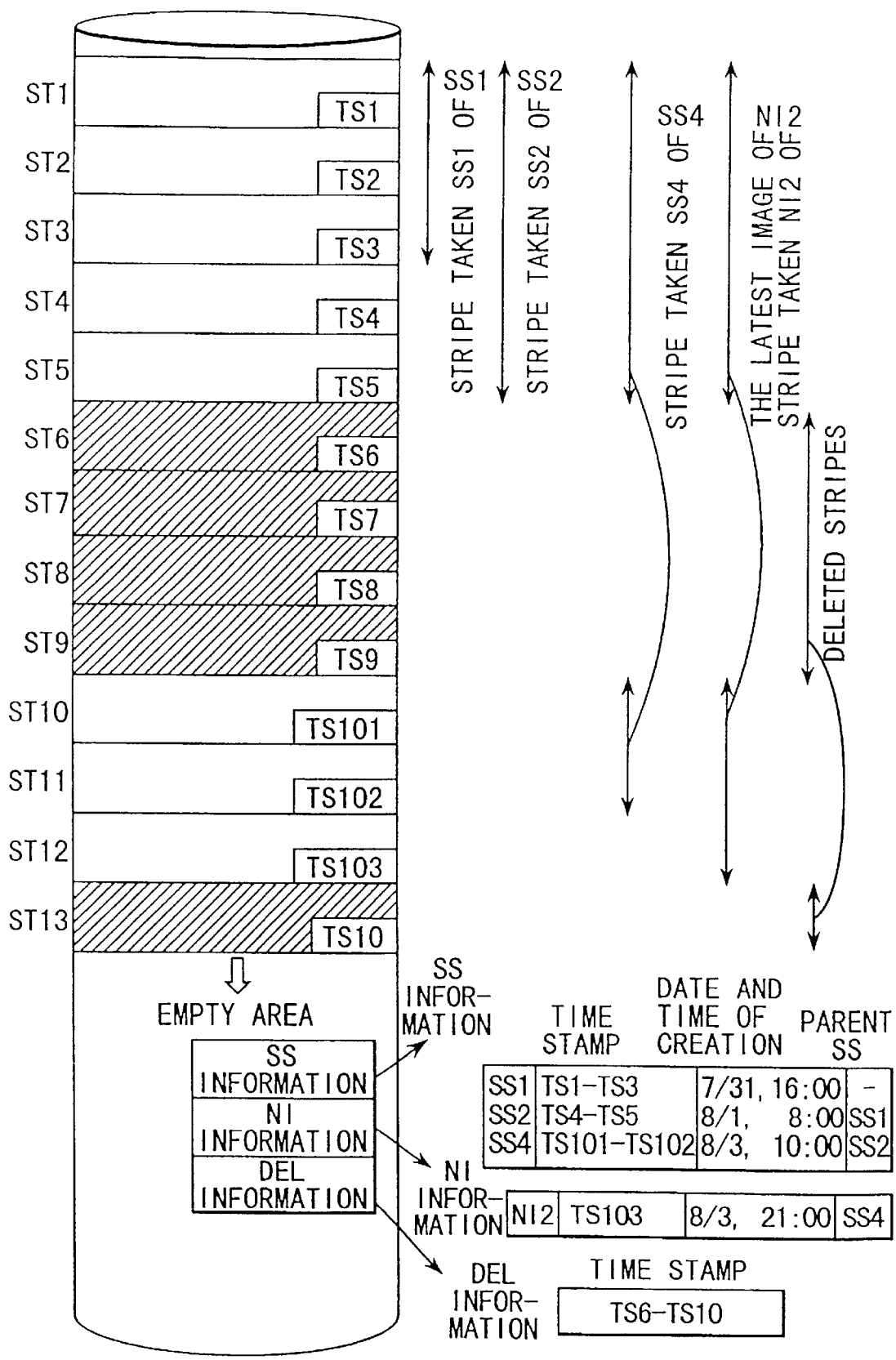
FIG. 29 is a diagram to help explain the snapshot information, latest image information, and time stamp information after the deletion of a snapshot in the fourth embodiment.

To modify a snapshot, as shown in FIG. 27, parent snapshot information (parent SS) and the time stamps for the stripes written between the creation of parent SS and that of the snapshot are stored as snapshot information on the disk device 4. For example, snapshot SS3 in FIG. 27 stores SS2 as parent SS for snapshot information, because the snapshot on which the snapshot SS3 is based is SS2. Furthermore, because the time stamps for the stripes written between the creation of SS2 and that of SS3 are TS6 to TS8, TS6 to TS8 are stored as time stamps for snapshot information. To realize more than one latest disk image, parent SS and the time stamps for the stripes written between the creation of parent SS and that of the latest image are stored on the disk device 4 as the latest image (N1) information, as in the snapshot information.

As shown in FIGS. 26(*a*) and 26(*b*), a case where snapshot SS2 is modified to create snapshot SS4 will be considered. First, SS2 is referred to using the aforesaid virtual disk. Then, the operating system or an application program updates snapshot SS2. When the writing block for the update has arrived at the disk snapshot section 3, the disk snapshot section 3 creates the latest image NI2 as the latest image information, because the update is not an additional update to the latest image NI1 at the beginning of SS3. (Because parent SS is SS2, the information is stored as parent SS for NI2.) As in an ordinary write operation at the disk snapshot section 3, the writing blocks are accumulated sequentially in the writing buffer 8 on the memory 6. When a K−1 number of writing data items (i.e., one stripe of data less one block) have accumulated in the writing buffer 8, they are written into the disk device 4. A logical address tag block is created as the last writing block from the logical address and time stamp for each block. To update the normal latest image NI1 and SS2 simultaneously, another writing buffer 8 for snapshot modification is prepared and they are accumulated separately. Then, the time stamp TS101 for stripe ST1O written into the disk device 4 is recorded as the time stamp for the latest image NI2 (see FIG. 27).

The process of creating snapshot SS4 after the modification of SS2 is the same as the above-described snapshot creation process. Specifically, null addresses are stored in the entry in the buffer management table 9 corresponding to the unfilled portion of the disk and the data items accumulated at that point in time are written into the disk device 4. Then, on the basis of information on the latest image NI2 (where parent SS is SS2 and time stamp is TS101) and the value TS102 of the time stamp added at this time, SS2 as parent SS and TS101 to TS102 as time stamps are written into the disk device 4 as the snapshot information for snapshot SS4. Then, the value of the time stamp is incremented when the writing has been completed. The SS4 newly created as parent SS is stored in the latest image information about the latest image N12 and the time stamp is cleared.

When the snapshot SS4 is updated and stripe ST13 is written into the disk device, TS103 is stored in the time stamp information about the latest image NI2.

Next, the process of referring to the latest image or a snapshot when a snapshot is modified will be explained. Consider a case where snapshot SS4 is referred to when the disk device 4 is in the state of FIG. 27. Because the SS4 is a snapshot obtained by modifying SS2, the stripes used for the creation of a reference conversion map have to be ST1 to ST5 for SS2 and ST10 to ST11 for SS2 to SS4. These stripes are found according to the following procedure.

It is found from the snapshot information that the parent SS for SS4 is SS2 and the time stamps for the stripes holding the updated data for SS2 to SS4 are TS101 to TS102. Then, it is found from the snapshot information 10 that the parent SS for SS2 is SS1 and the time stamps for the stripes holding the updated data for SS1 and SS2 are TS4 and TS5. After this process is repeated until no parent SS is left, it is found that the time stamps for the stripes written into until snapshot SS4 has been created are TS1 to TS3, TS4 to TS5, and TS101 to TS102.

Therefore, the comparison of the time stamps for the respective stripes on the disk makes it possible to find ST1 to ST5 and ST10 to ST11, the target stripes at the time of referring to SS4. In the above embodiment, to read the latest disk image, a conversion map is created for the all of the stripes on the disk device. When a stripe is changeable, the time stamp for a stripe to be processed is determined by carrying out a similar process to snapshot reference using the latest image information and snapshot information.

In explanation of the process of modifying a snapshot, the time stamp for the latest image (NI) information is modified each time the stripe is written. In the case of the snapshot information and the time stamp for the latest image information, interval information is easier to handle as shown in FIG. 27. To make use of the easiness, the following method can be considered: when the latest image (NI) is formed, a time stamp value used in writing is reserved beforehand and stored in the disk device as time stamp (TS) information (see FIG. 27). With this method, even if the time stamp for the latest image information is not updated each time the stripe is written, the information can be retrieved by checking for time stamps for all of the stripes on the disk. For example, even if the time stamp for the latest image NI2 is not updated when the stripe ST13 has been written, because the time stamp for the latest image NI2 has been allotted TS101 to TS200 and the largest time stamp lying in the interval in the stripe on the disk device 4 is TS103, it is seen that the last time stamp for NI2 is TS103. Because the time stamp values have been divided for each latest image, the snapshot information and the time stamp values for NI information never fail to be interval information.

Figure 28:
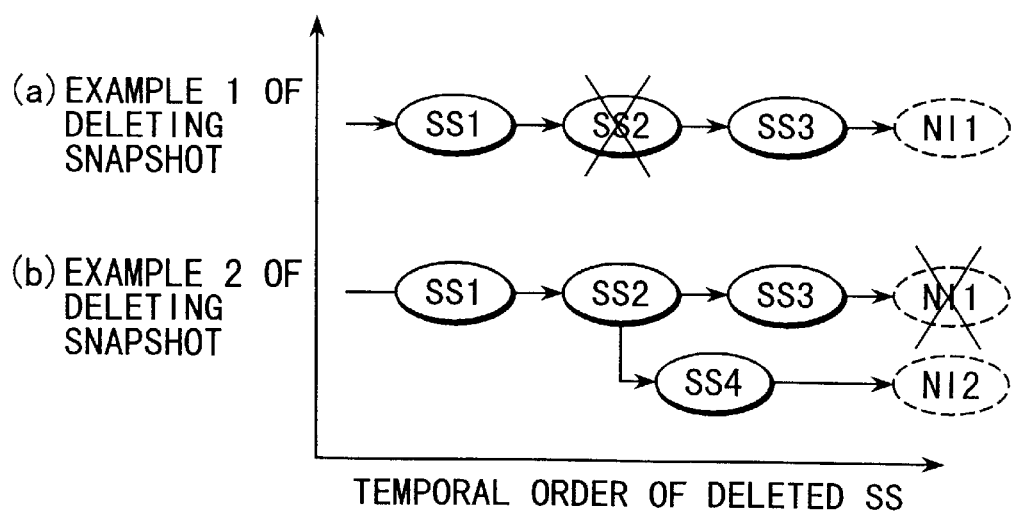
FIG. 28 is a diagram to help explain the deletion of a snapshot in the computer system according to the fourth embodiment.

Here, the process of deleting a snapshot will be explained by reference to FIG. 28. When the modification of a snapshot is not permitted, snapshot SS2 is deleted as shown in FIG. 28(a) by simply deleting information on snapshot SS2. The deletion does not require a special process. When the modification of a snapshot is permitted, however, the process of deleting a snapshot is more complicated. The snapshot information or latest image information include parent SS. Therefore, when parent SS has been deleted, it is necessary to make the parent SS for the deleted parent SS the parent SS for the snapshot information or latest image information. Furthermore, the time stamp for the snapshot information or latest image information has to be modified so that it may include the time stamp for the deleted parent SS.

Moreover, to delete snapshot SS3 and the latest image NI1 as shown in FIG. 28(b) with the disk in the stat e of FIG. 27, it is necessary not only to delete the snapshot information and NI information but also store snapshot SS3 and the time stamp for the latest image NI1 on the disk device 4 as de leted stripe informat ion (DEL information) and prevent the use of these t ime stamps.

Fifth Embodiment

Hereinafter, a fifth e mbodiment of the present invention will be explained.

In the snapshot creating process in the above embodiments, because one stripe is made up of only the updated data items accumulated at that point in time and written into the disk device 4, there is no updated data item in the stripe at the time of snapshot creation. This produces a useless area on the disk device 4. As a snapshot is created more frequently, the number of useless areas increases on the disk device 4.

Figure 30:
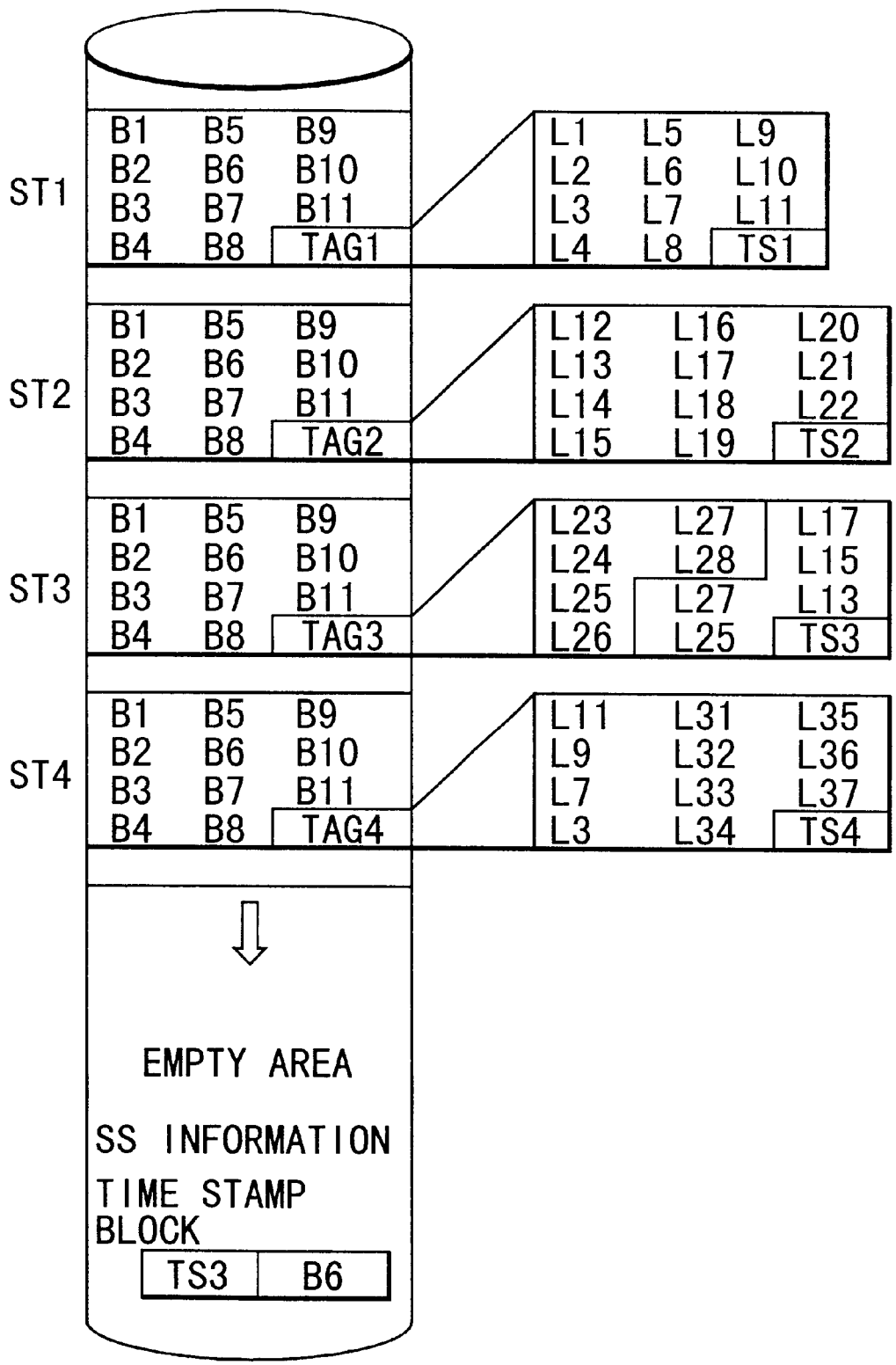
FIG. 30 shows the snapshot information in a computer system according to a fifth embodiment of the present invention.

The process of creating a snapshot is the same as the above-described snapshot creation process. Specifically, null addresses are stored in the buffer management table 9 corresponding to the unfilled portion of the disk and the data items accumulated at that point in time are added with time stamps and written into the disk device 4. At this time, as shown in FIG. 30, not only the time stamp values but also the block numbers in the stripe accumulated at the time of snapshot creation are stored as snapshot information.

Then, in the writing process immediately after the snapshot creation, the updated data items are stored consecutively into the writing buffer 8 without clearing the writing buffer 8 or the buffer management table 9. Then, when a K−1 number of data items (i.e., one stripe of data less one block) have accumulated in the writing buffer 8, a logical address tag block is created and written into the disk device 4. At this time, the value at the time of snapshot creation is written in the time stamp for the logical address tag block and the position of the disk device in which data is to be written is written in the same stripe as that at the time of snapshot creation (ST3 in FIG. 30).

In the process of referring to the snapshot created in this way, for a stripe in which the time stamp value for the snapshot information coincides with the time stamp, invalid blocks at the time of creating a conversion map are judged using the blocks up to the one for the snapshot information as the objects of the snapshot. That is, in FIG. 30, for stripe ST3, blocks B1 to B6 are determined to be the objects of the snapshot.

By processing data items as described above in the writing process immediately after the snapshot creation and the snapshot reference process, a snapshot can be created without producing a useless area in the stripe in a snapshot.

Sixth Embodiment

Hereinafter, a sixth embodiment of the present invention will be explained.

In a method of accumulating the updated data items and writing them in a separate empty area previously provided in the disk device instead of rewriting the unupdated data area in the disk snapshot section 3 in the first to fifth embodiment, it is indispensable for an empty area to exist constantly. To meet this requirement, when the file system 2 does not access the disk, an empty area has to be formed by gathering invalid data items caused because data has been written into the other areas. Here, this process is called a repacking process. The repacking process is composed of two steps: invalid block judgment and stripe integration. An invalid block is a block that is not accessed in a snapshot reference operation or an ordinary reading operation. That is, a block specified by neither the snapshot reference conversion map nor the reading conversion map is an invalid block.

Figure 31:
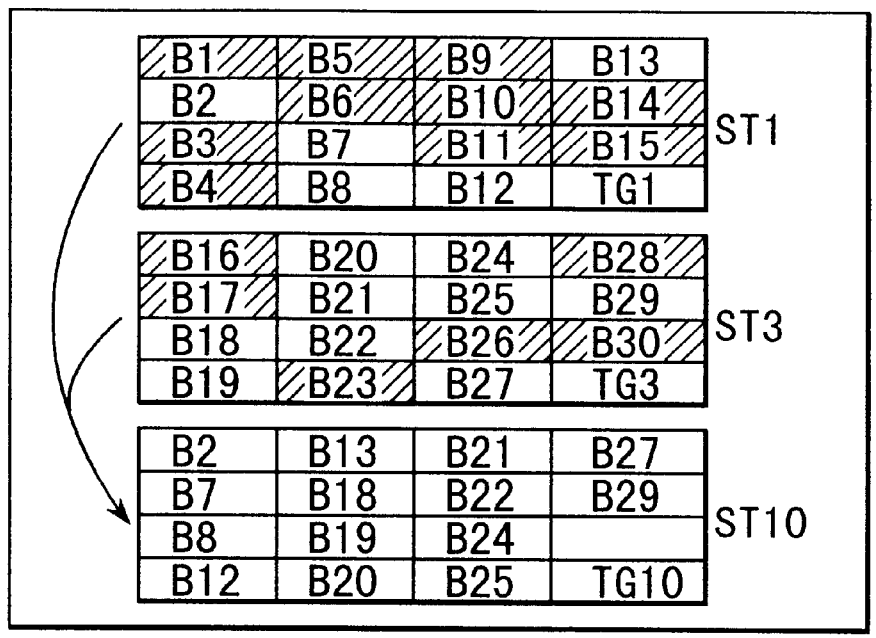
FIG. 31 shows a diagram to help explain the repacking process in the computer system according to the sixth embodiment.
Figure 32:
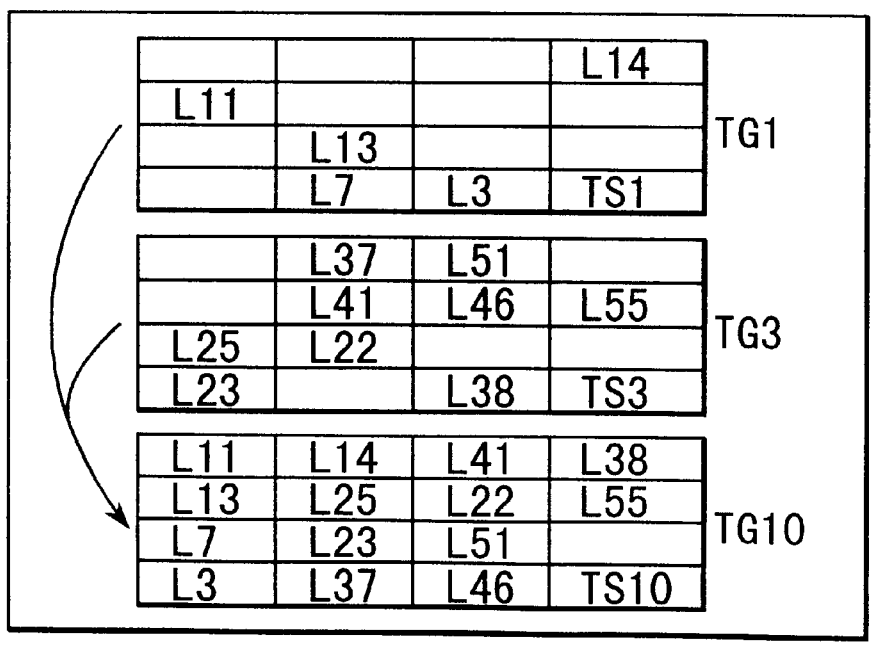
FIG. 32 shows logical address tags to help explain. the repacking process in the computer system according to the sixth embodiment.

As an example of stripe integration, consider a case where two stripes ST1 and ST3 are integrated into a single stripe ST10 as shown in FIG. 31. It is assumed that five blocks B2, B7, B8, B12, and B13 are valid in stripe ST1 and the other ten blocks are invalid as shown in FIG. 31. Similarly, it is assumed that blocks B18, B19, B20, B21, B22, B24, B25, B27, and B29 are valid in stripe ST3 and the other six blocks are invalid. The two stripes have only 14 valid blocks in total. Integrating the two stripes into a single stripe produces a single empty area.

In stripe integration, the two stripes are read into a memory and only the valid blocks are transferred to the writing buffer. In parallel with this, a logical address tag TG10 is formed by moving only the logical addresses for the valid blocks in TG1 and TG3 to the corresponding positions and the time stamp at that time is updated. In the example, because there are only 14 valid blocks, they are written, leaving the last data block blank. At this time, the fact that there is no data can be represented by entering a null address into the logical address for the last data block in logical address tag TG10, so there is no problem.

When there is a snapshot, simple repacking cannot empty the area to be repacked. This will be explained by reference to FIG. 33.

Figure 33:
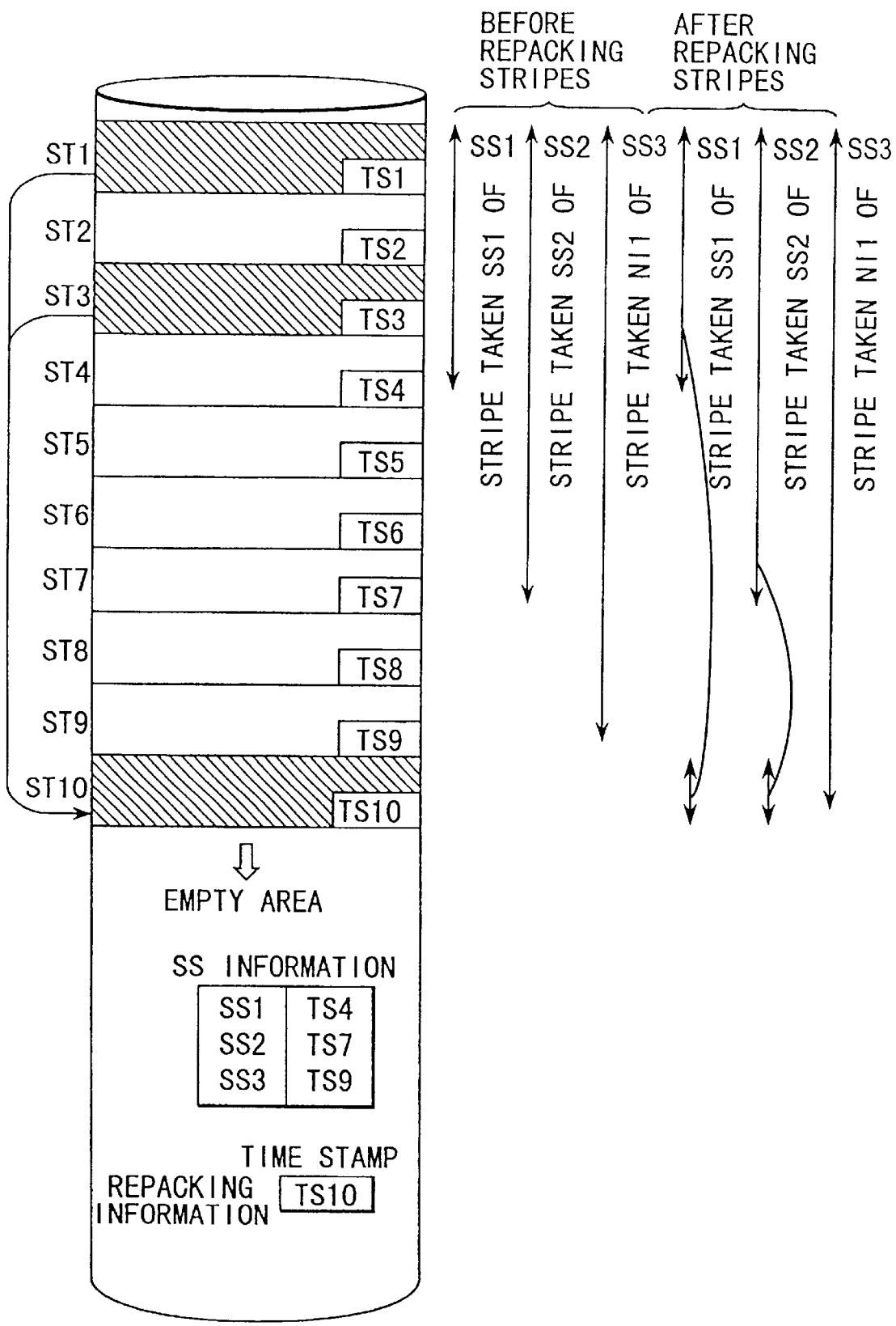
FIG. 33 is a diagram to help explain repacking information in the computer system according to the sixth embodiment.

Even if a new stripe ST10 is formed by repacking stripes ST1 and ST3 as shown in FIG. 33, snapshot SS1 is created for the stripes whose time stamps are TS1 to TS4 in the snapshot information and the blocks in the stripes ST1 and ST3 supposed to be in the empty state are accessed.

To overcome this problem, as shown in FIG. 33, the time stamp for the stripe created in repacking is stored on the disk as repacking information. In the stripe reference process, not only the stripe determined by the time stamp value of the snapshot information but also the stripe for the time stamp for the repacking information are to be referred to for invalid block judgment. For example, in the process of referring to snapshot SS1, not only stripes (ST1 to ST4) whose time stamp is smaller than TS4 but also the stripe (ST10) for the time stamp for the repacking information are subjected to invalid block judgment. Therefore, all of the blocks in stripes ST1 and ST3 are always judged to be invalid because the stripe ST10 has been formed by repacking the effective blocks in stripes ST1 and ST3, which prevents stripes ST1 and ST3 from being referred to by snapshots. Consequently, stripe ST10 is virtually an empty area.

Figure 34:
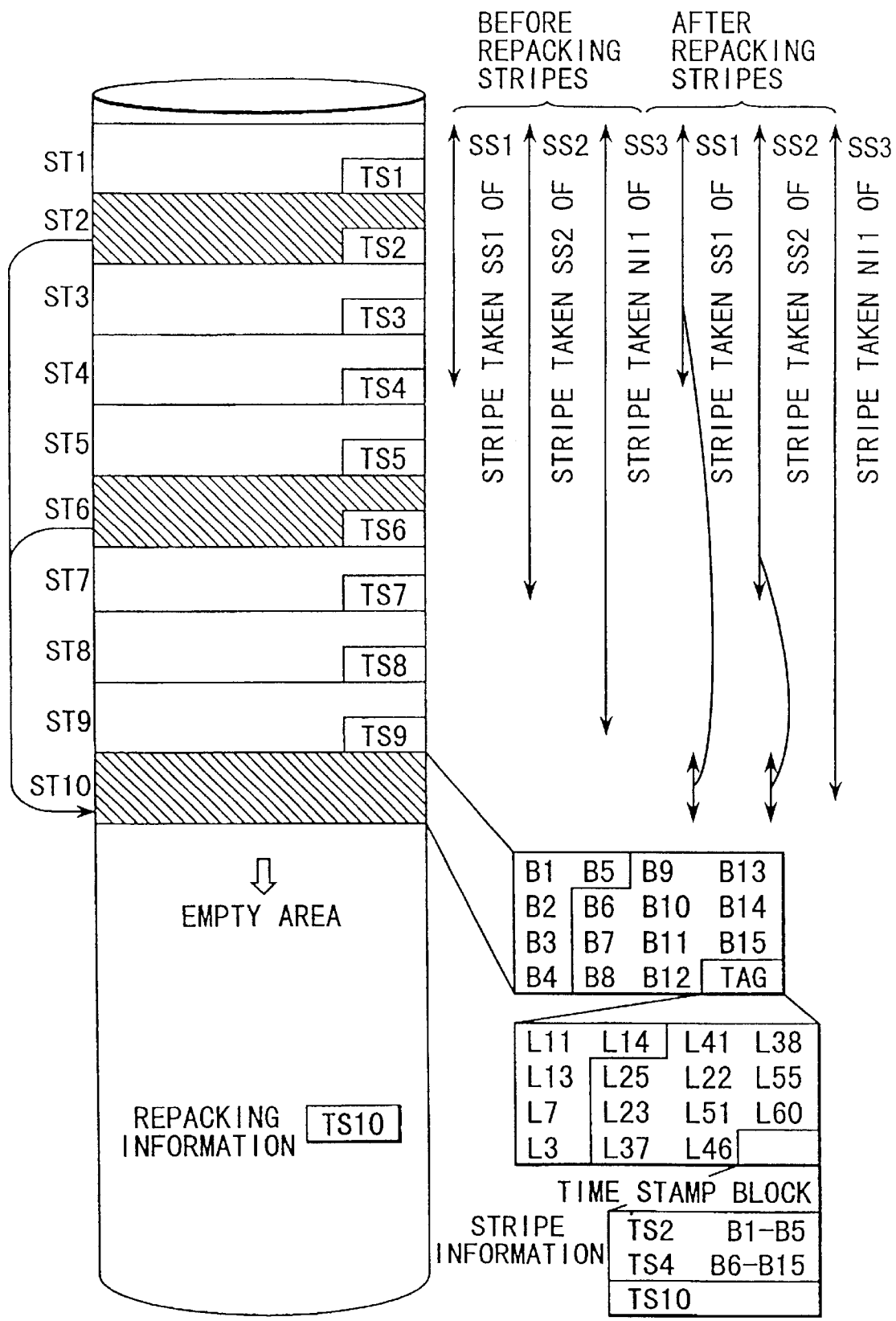
FIG. 34 is a diagram to help explain the original stripe information in the computer system according to the sixth embodiment.

This method works properly only when the stripes referred to by only the same snapshot are repacked. When stripe ST2 referred to by snapshots SS1, SS2, and SS3 and stripe ST6 referred to by snapshots SS2 and SS3 are repacked to produce stripe ST10 as shown in FIG. 34, the method does not work properly. The reason is that since stripe ST10 includes an updated block of stripe ST6 written after the creation of snapshot SS1, if stripe ST10 is referred to in the process of referring to snapshot SS1, the disk state at the time of creating SS1 cannot b e reproduced.

To overcome this problem, as shown in FIG. 34, the time stamps for individual original stripes and the block positions in which the original blocks have been stored are stored as original stripe information in the stripe formed by repacking. Then, in the snapshot reference process, the unnecessary blocks are prevented from being referred to for the stripe created by repacking (known from the repacking information) on the basis of the original stripe information. Namely, in the process of referring to snapshot SS1, all of the blocks in stripe ST10 are not referred to. Instead, only blocks B1 to B6 (time stamp TS2) whose time stamp is smaller than the time TS4 for snapshot SS1 are referred to. This makes it possible not only to reproduce the disk image at the time of creating snapshot SS1 but also makes ST2 an empty area with all of the blocks in stripe ST2 being invalid.

In explanation of the repacking process, an invalid block is d defined as a block that is not accessed in a snapshot reference operation or in an ordinary image reading operation. A snapshot reference conversion map and a reading conversion map are formed and blocks not referred to are found using the conversion maps. With this method, however, as the number of snapshots increases, the number of conversion maps to be formed increases, resulting in a very poor efficiency.

Figure 35:
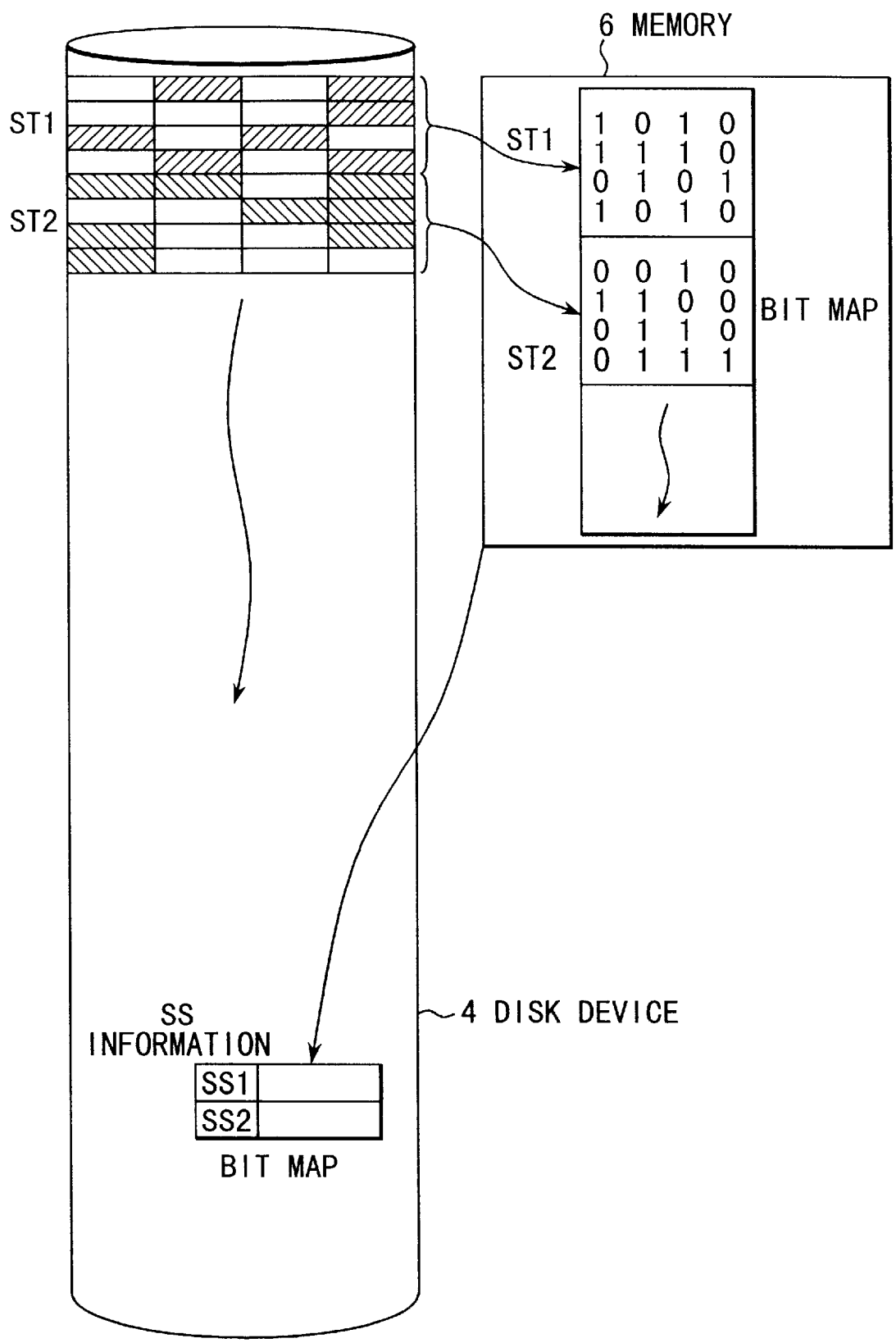
FIG. 35 shows the structure for judging an invalid block by using a bit map corresponding to invalid blocks in the sixth embodiment.

A method of using a bit map corresponding to invalid blocks for the judgment of invalid blocks will be explained. FIG. 35 shows the structure for judging invalid blocks using a bit map corresponding to invalid blocks.

As shown in FIG. 35, the state of all of the blocks on the disk device 4 forming the latest disk image at the present time is stored in the form of a bit map.

The bit map can be formed easily by invalidating all of the bits in initialization and then validating the bits corresponding to the block to be referred to with the reading conversion map. When the updated data items in the writing buffer 8 are written into an empty stripe in the writing process, the bit map for the stripe written into is made valid (the bits corresponding to the block for which a null address has been set in the writing buffer management table 9 are left invalid). Then, the block position before the writing with respect to the logical address changed by the writing is determined from the reading conversion map. The block is determined to be an invalidated block and the corresponding bit map is made invalid. If the bit map modification is made each time the updated data item is written, this will make it possible to always maintain the state of all the blocks on the disk device forming the latest disk image.

In a snapshot creation process, the bit map is also stored as snapshot information as shown in FIG. 35. In the process of judging an invalid block, a block in the invalid state is determined to be a invalid state by checking the bit map on the memory 6 and all of the bit map for the snapshot information. This makes it possible to judge an invalid block without crating a conversion map for a snapshot and easily find a stripe to be repacked.

Figure 36:
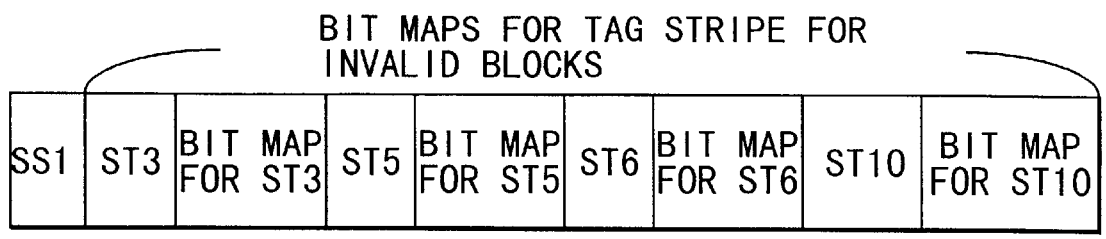
FIG. 36 shows an example of storing, as snapshot information, only the bit maps for stripes containing many invalid stripes at the time of creating a snapshot in the sixth embodiment.

While in FIG. 35, all of the bit maps on the memory 6 are stored as snapshot information, only the maps for the stripes containing many invalid blocks at the time of creating snapshots may be stored as snapshot information as shown in FIG. 36. In the example of FIG. 36, because stripes ST3, ST5, ST6, and ST10 have many invalid blocks, only the bit maps for these bit maps are stored as stripe information. This reduces the area for snapshot information and enables an invalid block judgment to be made efficiently for repacking.

Seventh Embodiment

Hereinafter, a seventh embodiment of the present invention will be explained.

Figure 37:
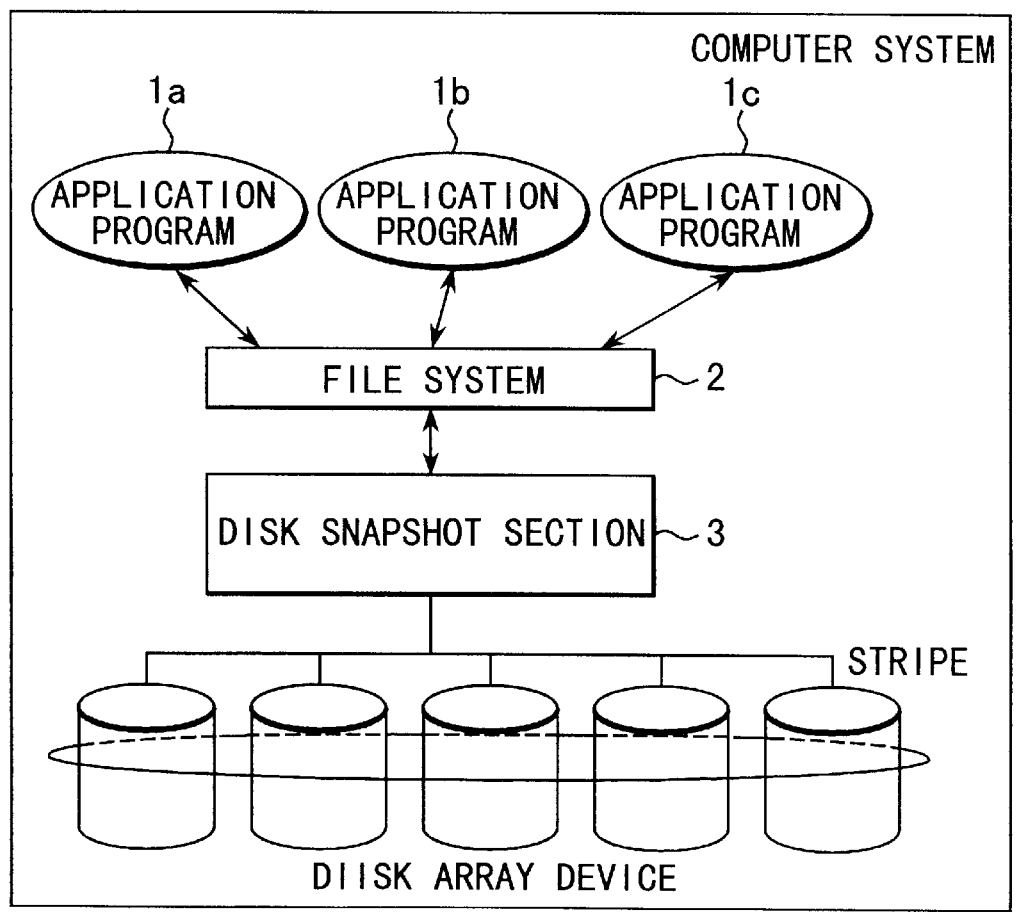
FIG. 37 illustrates an example of constructing, from a disk array device, a disk device for a computer system according to a seventh embodiment of the present invention.

The first to sixth embodiments are based on the assumption that the updated data items, snapshot information, latest image information, deleted stripe information, and repacking information are stored in a single disk device. As shown in FIG. 37, the various types of information may be stored into a disk array device (RAID0, 1, 3, 4, 5) which is a logical disk device composed of more than one disk device. In the case of RAID0, "a stripe unit (preferably, a size close to one track length of the disk device)×the number of disks" is selected as the size of stripe used in the above explanation. In the case of RAID3, RAID4, and RAID5, "a stripe unit×(the number of disks−1)" is selected as the size of stripe. The selection enables all the disks to be written into with the same timing, resulting in a very good efficiency. Particularly in RAID4 and RAID 5 using parity as redundant information, two reading operations and one writing operation, which are generally needed, are not necessary, resulting in a very good efficiency.

The present invention is applicable to not only a computer system using a disk device as a nonvolatile storage device but also a computer system that requires snapshots or backups using various types of nonvolatile storage device, such as a DVD-RAM or an EEPROM.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system provided with a file system for managing access to files stored in a nonvolatile storage device, comprising:

snapshot management means which intervenes between said file system and said nonvolatile storage device, and which creates accumulated blocks of write-in data supplied from said file system, to be supplied to nonvolatile storage device in log form, and stores said accumulated blocks of said write-in data and logical address tag information created based on a logical address and time stamp of said write-in data, in said nonvolatile storage device as a snapshot.

2. A computer system according to claim 1, further comprising a snapshot file system for managing access to said snapshot, wherein said snapshot management means includes means for causing said nonvolatile storage devices to appear to said snapshot file system to be a separately defined virtual storage device.

3. A computer system according to claim 2, wherein said snapshot management means includes means for making said virtual storage device a removable storage device with replaceable media.

4. A computer system according to claim 1, further comprising a snapshot file system for managing access to said snapshot, wherein said snapshot management means includes means for causing said nonvolatile storage devices to appear to said file system and said snapshot file system to be a removable storage device with replaceable media.

5. A computer system according to claim 1, wherein said snapshot management means includes means for starting up said nonvolatile storage devices so that said file may have the contents at the time of creating a snapshot selected at system start-up.

6. A computer system according to claim 1, wherein said snapshot management means includes means for making a modification to said snapshot stored in said nonvolatile storage devices.

7. A computer system according to claim 6, wherein said snapshot management means includes means for invalidating a modification made to said snapshot stored in said nonvolatile storage devices.

8. A computer system according to claim 1, wherein said file system includes a cache area for temporarily storing at least one of a plurality of updated data items, and said computer system further comprises restored-state realizing means for instructing not only said file system to write all of the plurality of updated data items stored in said cache area into said nonvolatile storage device but also said snapshot management means to create a snapshot including the updated data item.

9. A computer system according to claim 8, wherein said restored-state realizing means includes means for giving not only a first instruction to said snapshot management means but also a second instruction to said snapshot means when receiving a write complete response from said file system after having instructing said file system to write said updated data item into said novolatile storage device, and said snapshot management means includes means for creating said snapshot only when said file system does not write said updated data item between the time it receives said first instruction and the time it receives said second instruction.

10. A data sheltering method in a computer system provided with a file system for managing access to files stored in a nonvolatile storage device and writing buffer with a storage capacity equivalent to a K number of logical blocks, comprising:

the step of accumulating logical blocks of data items to be updated in said writing buffer in a normal writing process;

the step of delaying the update of the data items in the logical blocks until the number of the accumulated logical blocks has reached K−1;

the step of creating a logical address tag block composed of the logical addresses for the individual logical blocks accumulated in said writing buffer;

the step of adding a time stamp for maintaining the temporal order of writing to the logical address block;

the step of adding said logical address tag block to a K−1 number of blocks to form one stripe containing a K number of logical blocks and writing stripes consecutively in an empty area different from the area holding the data to be updated on said nonvolatile storage device;

the step of determining the logical addresses for a K−1−L number of logical blocks in said writing buffer unfilled with the logical blocks of data items to be updated at the time of creating a snapshot to be null addresses in a snapshot creation process of creating a snapshot holding the contents of said file at a specific point in time;

the step of creating a logical address tag block composed of the logical addresses for an L number of logical blocks accumulated in said writing buffer at the time of creating the snapshot and said null addresses;

the step of adding a time stamp for maintaining the temporal order of writing to the logical address tag block;

the step of adding said logical address tag block to a K−1 number of blocks including said L number of logical blocks to form one stripe containing a K number of logical blocks and writing stripes consecutively in an empty area different from the area holding the data to be updated into said nonvolatile storage device; and the step of recording said added time stamp as snapshot information.

11. A data sheltering method according to claim 10, further comprising:

the step of causing a place in which said created snapshot is stored to appear to be a virtual storage device defined separately from said nonvolatile storage device;

the step of, when a reading request has been made to said virtual storage device, searching for a stripe which has been written at or before the time indicated by the time stamp recorded as said snapshot information and which is the last written stripe including the block at the logical address requested to be read; and the step of reading the block from the searched stripe corresponding to the logical address to be requested and returning the read data as a response to the request.

12. A data sheltering method according to claim 11, further comprising:

the step of informing the operating system that said virtual storage device is removable, when being asked by the operating system about said virtual storage device; and the step of returning a media uncertain response in access after snapshot change and reading data from said virtual storage device according to the time stamp in the snapshot to be changed.

13. A data sheltering method according to claim 11, further comprising:

the step of inquiring about a snapshot to be referred to at system start-up; and the step of reading data from said virtual storage data on the basis of the time stamp in the snapshot selected according to the inquiry.

14. A data sheltering method according to claim 10, further comprising:

the step of causing a place in which said created snapshot is stored to appear to be a virtual storage device defined separately from said nonvolatile storage device;

the step of searching for a physical block which is a stripe that has been written at or before the time indicated by the time stamp recorded as said snapshot information and which corresponds to the last written stripe including the blocks of the individual logical addresses;

the step of creating a snapshot conversion map indicating the correspondence between said logical address and the physical block sensed in said search; and the step of returning the physical block corresponding to the requested logical address as a response on the basis of said created snapshot conversion map, when a reading request has been made to said virtual storage device.

15. A data sheltering method according to claim 14, further comprising:

the step of informing the operating system that said virtual storage device is removable, when being asked by the operating system about said virtual storage device; and the step of returning a media uncertain response in access after snapshot change and reading data from said virtual storage device according to the time stamp in the snapshot to be changed.

16. A data sheltering method according to claim 14, further comprising:

the step of inquiring about a snapshot to be referred to at system start-up; and the step of reading data from said virtual storage data on the basis of the time stamp in the snapshot selected according to the inquiry.

17. A data sheltering method according to claim 10, further comprising:

the step of composing said snapshot information from an identifier for a parent snapshot and the time stamp for the stripe written after the identifier; and the step of determining a target stripe while tracing the parent snapshot in said snapshot information, when referring to snapshots.

18. A data sheltering method according to claim 10, further comprising:

the step of composing the latest image information from an identifier for a parent snapshot and the time stamp for the stripe written after the identifier; and the step of determining a target stripe while tracing the parent snapshot in said latest information, when reading the latest image.

19. A data sheltering method according to claim 18, further comprising:

the step of allocating the range of time stamps corresponding to the latest image beforehand and storing it as time stamp information; and the step of finding, as the time stamp for the latest image information, those of the time stamps for the stripes written in said nonvolatile storage device and lying in the range of said time stamp information.

20. A data sheltering method according to claim 10, further comprising the step of accepting the deletion of said snapshot information or said latest image information.

21. A data sheltering method according to claim 20, further comprising the step of storing, as delete stamp information, the time stamps for the stripes prevented from being accessed as a result of deletion.

22. A data sheltering method according to claim 10, further comprising the step of composing said snapshot information from said time stamp and the block position in the stripe; and the step of writing the logical blocks in said writing buffer onto the same stripe with the same time stamp as that in the preceding writing operation without clearing said writing buffer even after said snapshot has been created.

23. A data sheltering method according to claim 10, further comprising the step of determining blocks referred to by neither the latest image nor snapshots to be invalid blocks and repacking more than one stripe into a new single stripe.

24. A data sheltering method according to claim 23, further comprising the step of recording the time stamp for the new stripe after said repacking as repacking information and including the stripe with the time stamp for said repacking information into stripes to be searched for.

25. A data sheltering method according to claim 23, further comprising the step of recording the identifier for said repacked stripe as the original stripe information for the new stripe after said repacking and using said original stripe information in referring to the snapshot.

26. A data sheltering method according to claim 23, further comprising the step of storing, as snapshot information, a bit map indicating the state of each logical block in the stripe and using the bit map in judging invalid blocks.

27. A data sheltering method according to claim 26, further comprising the step of storing, as snapshot information, only the bit maps for stripes containing many invalid blocks.

28. A data sheltering method according to claim 10, further comprising the step of adding the date and time of creation to said snapshot information and latest image information; and the step of using said added date and time to identify a snapshot or latest image.

29. A data sheltering method according to claim 10, further comprising the step of setting the size of said stripe at a stripe unit×the number of disks, when said nonvolatile storage device has a structure of RAID0.

30. A data sheltering method according to claim 10, further comprising the step of setting the size of said stripe at a stripe unit×(the number of disks−1), when said nonvolatile storage device has a structure of one of RAID3, RAID4, or RAID5.

\* \* \* \* \*

UNITED STATES PATENT AND TRADEMARK OFFICE
CERTIFICATE OF CORRECTION

PATENT NO.   : 6,311,193 B1
DATED        : October 30, 2001
INVENTOR(S)  : Kazunori Sekido It is certified that error appears in the above-identified patent and that said Letters Patent is hereby corrected as shown below:

Column 20,
Line 54, "novolatile" should read -- nonvolatile --.

Signed and Sealed this

Fourth Day of June, 2002

Attest:

Attesting Officer

JAMES E. ROGAN
Director of the United States Patent and Trademark Office